United States Patent
Min et al.

(10) Patent No.: US 10,828,607 B2
(45) Date of Patent: Nov. 10, 2020

(54) AERATOR DEVICE, FILTER SYSTEM INCLUDING AN AERATOR DEVICE, AND METHOD OF AERATING A FILTER USING AN AERATOR DEVICE

(71) Applicant: CHEIL INDUSTRIES INC., Uiwang-si (KR)

(72) Inventors: Gyu Hong Min, Uiwang-si (KR); Jin Min Kim, Uiwang-si (KR); Young Lim Koo, Uiwang-si (KR); Byung Kook Hwang, Uiwang-si (KR); Daniel Eumine Suk, Uiwang-si (KR); Jong Sang Park, Uiwang-si (KR); Fufang Zha, Uiwang-si (KR); Jihye Kim, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 553 days.

(21) Appl. No.: 13/835,153

(22) Filed: Mar. 15, 2013

(65) Prior Publication Data
US 2014/0076806 A1 Mar. 20, 2014

Related U.S. Application Data

(60) Provisional application No. 61/701,476, filed on Sep. 14, 2012.

(30) Foreign Application Priority Data

Aug. 9, 2012 (KR) .......................... 10-2012-0087488

(51) Int. Cl.
*B01D 65/08* (2006.01)
*B01F 3/04* (2006.01)
(Continued)

(52) U.S. Cl.
CPC .......... *B01D 65/08* (2013.01); *B01F 3/04113* (2013.01); *B01F 3/04241* (2013.01);
(Continued)

(58) Field of Classification Search
CPC ........ B01D 61/18; B01D 63/02; B01D 63/04; B01D 63/08; B01D 65/02; B01D 65/08;
(Continued)

(56) References Cited

U.S. PATENT DOCUMENTS 3,904,524 A * 9/1975 Pelton et al. .................. 210/94
5,783,083 A 7/1998 Henshaw et al.
(Continued)

FOREIGN PATENT DOCUMENTS

CN 2676219 Y 2/2005
CN 2793623 Y 7/2006
(Continued)

OTHER PUBLICATIONS

U.S. Appl. No. 13/835,153—Portion of Office Action dated Jul. 14, 2016, 11 pages.*
(Continued)

*Primary Examiner* — Bobby Ramdhanie
*Assistant Examiner* — Denise R. Anderson
(74) *Attorney, Agent, or Firm* — Lewis Roca Rothgerber Christie LLP

(57) ABSTRACT

An aerator device, a filter system including an aerator device, and a method of aerating a filter using an aerator device. An aerator device includes a housing having an interior cavity; a first plate in the interior cavity and defining a first cavity portion and a second cavity portion thereof, the first plate being spaced apart from a top wall of the housing to define a first opening through which the first cavity portion and the second cavity portion are in communication; and a second plate defining a first chamber and a second
(Continued)

chamber of the second cavity portion, the first chamber and the second chamber being in communication with each other below a lower end of the second plate, the housing having an inlet opening in communication with the first cavity portion, and an outlet opening through the top wall and in communication with the second chamber.

15 Claims, 20 Drawing Sheets

(51) Int. Cl.
*C02F 3/12* (2006.01)
*B01F 15/02* (2006.01)

(52) U.S. Cl.
CPC .......... *B01F 15/024* (2013.01); *C02F 3/1273* (2013.01); *B01D 2313/26* (2013.01); *B01D 2315/06* (2013.01); *B01D 2321/185* (2013.01); *B01F 2003/04304* (2013.01); *Y02W 10/15* (2015.05)

(58) Field of Classification Search
CPC ............ B01D 2313/26; B01D 2315/06; B01D 2321/185; B01F 3/04; B01F 3/04113; B01F 3/04241; B01F 3/04248; B01F 3/04439; B01F 2003/04106; B01F 2003/04113; C02F 3/12; C02F 3/1273; C02F 3/208; C02F 2201/007; C02F 2209/38
USPC ............ 210/321.69, 321.72, 321.75, 321.84, 210/500.23; 261/75
See application file for complete search history.

(56) References Cited

U.S. PATENT DOCUMENTS

| | | | |
|---|---|---|---|
| 5,863,472 A * | 1/1999 | Jones | B01F 3/04113 261/121.1 |
| 6,162,020 A | 12/2000 | Kondo | |
| 6,638,424 B2 * | 10/2003 | Stever et al. | 210/170.03 |
| 6,706,189 B2 * | 3/2004 | Rabie et al. | 210/636 |
| 7,122,121 B1 | 10/2006 | Ji | |
| 7,445,709 B2 * | 11/2008 | Beaule | C02F 1/24 210/221.2 |
| 8,038,882 B2 | 10/2011 | Hashimoto | |
| 2008/0017558 A1 | 1/2008 | Pollock et al. | |
| 2009/0283465 A1 * | 11/2009 | Nakayama | 210/202 |
| 2010/0218789 A1 * | 9/2010 | Baba | B01D 61/22 134/22.12 |
| 2011/0049047 A1 | 3/2011 | Cumin et al. | |
| 2011/0100907 A1 * | 5/2011 | Zha et al. | 210/615 |
| 2011/0198283 A1 | 8/2011 | Zha et al. | |
| 2012/0091602 A1 * | 4/2012 | Cumin | B01D 61/18 261/122.1 |
| 2015/0290563 A1 | 10/2015 | Boyle et al. | |

FOREIGN PATENT DOCUMENTS

| | | | |
|---|---|---|---|
| CN | 101448562 A | 6/2009 | |
| EP | 1 652 572 A1 | 5/2006 | |
| JP | 2003340250 A * | 12/2003 | ............ B01D 65/02 |
| JP | 2004322100 A * | 11/2004 | ............ B01D 65/02 |
| WO | WO 2008/132186 A1 | 11/2008 | |
| WO | WO 2008/153818 A1 | 12/2008 | |
| WO | WO 2014/052139 A1 | 4/2014 | |

OTHER PUBLICATIONS

European Search Report in European Application No. 14200528.9 corresponding to related U.S. Appl. No. 14/587,658, European Search Report dated Jul. 13, 2015 (6 pgs.).
Non-final Office action from related U.S. Appl. No. 14/587,658, filed Dec. 31, 2014 Office action dated Mar. 10, 2016 (25 pgs.).
Extended European Search Report dated Mar. 3, 2016 and dated Mar. 10, 2016 in corresponding European Application No. 13828252. 0-1703 (8 pgs.).
Non-final Office Action from related U.S. Appl. No. 14/587,658, Non-final Office Action dated Jun. 15, 2018 (10 pages total).

* cited by examiner

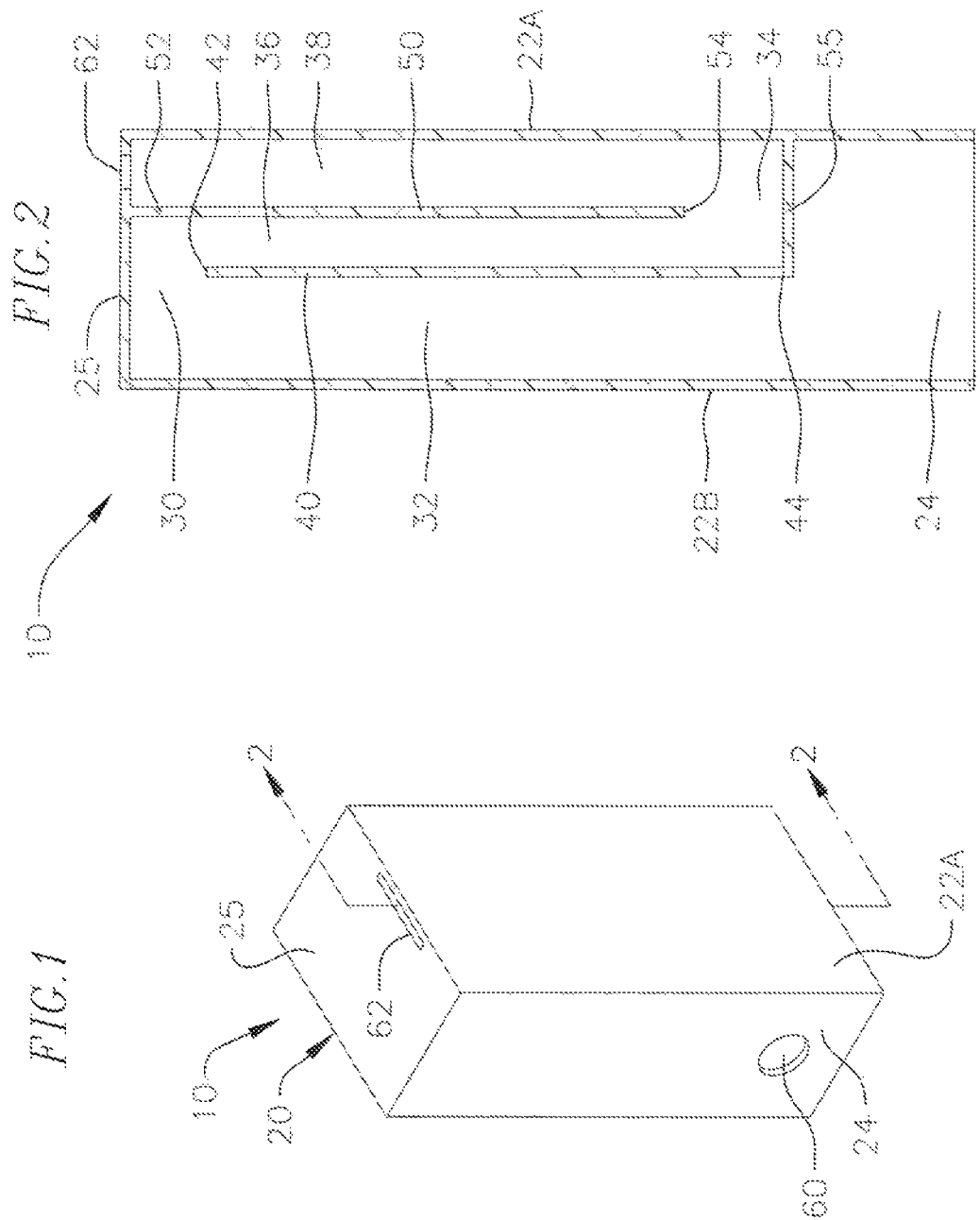

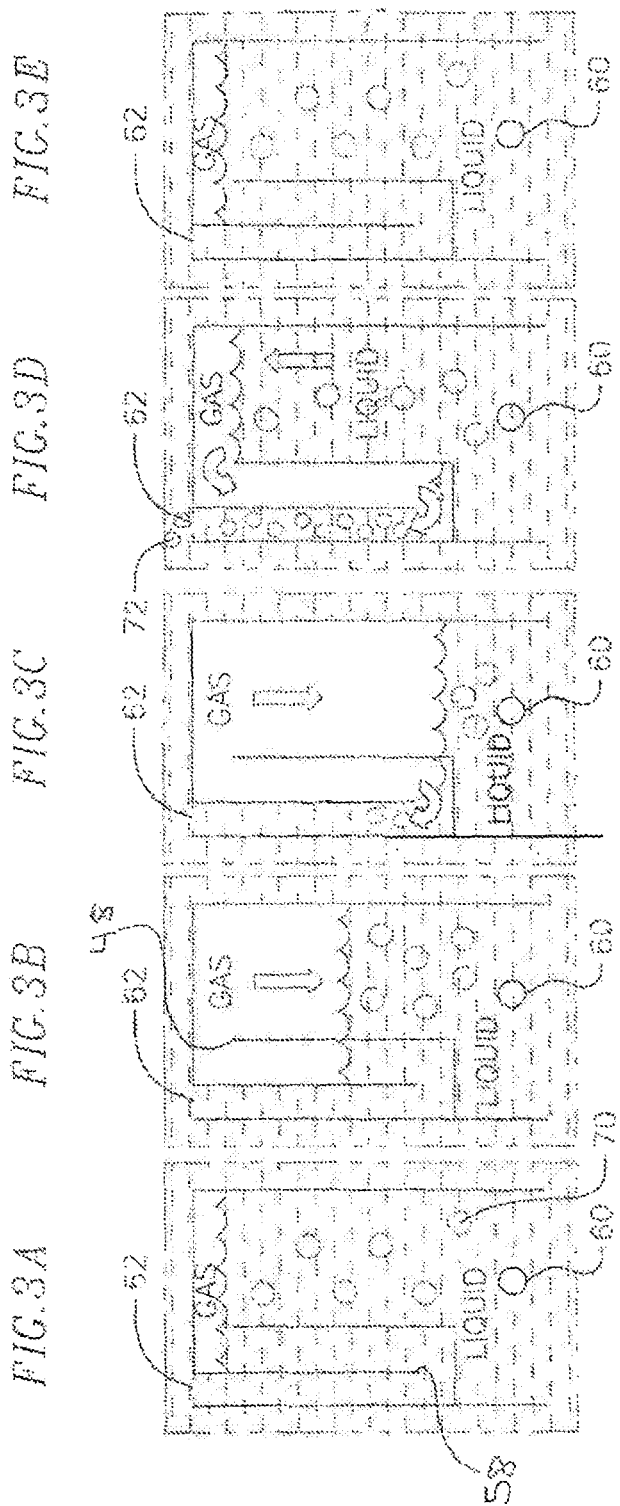

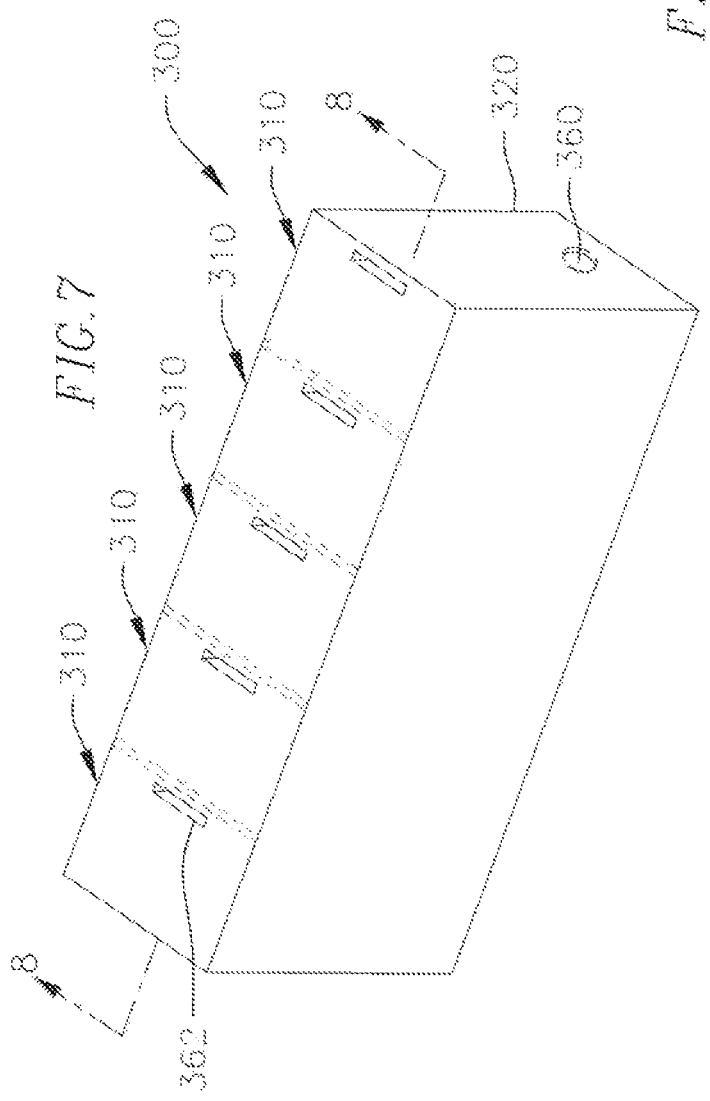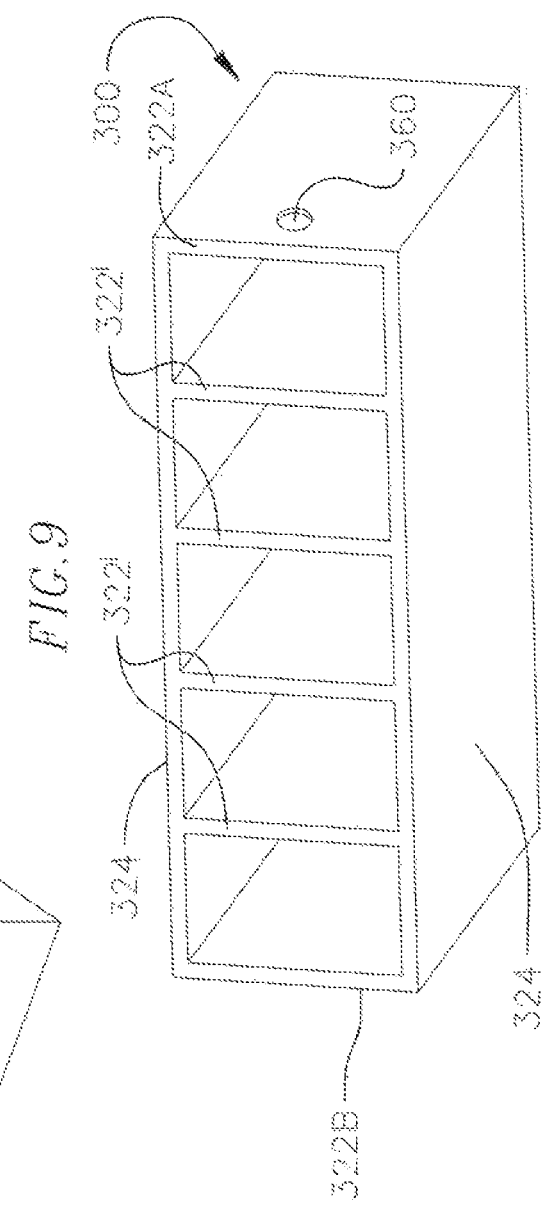

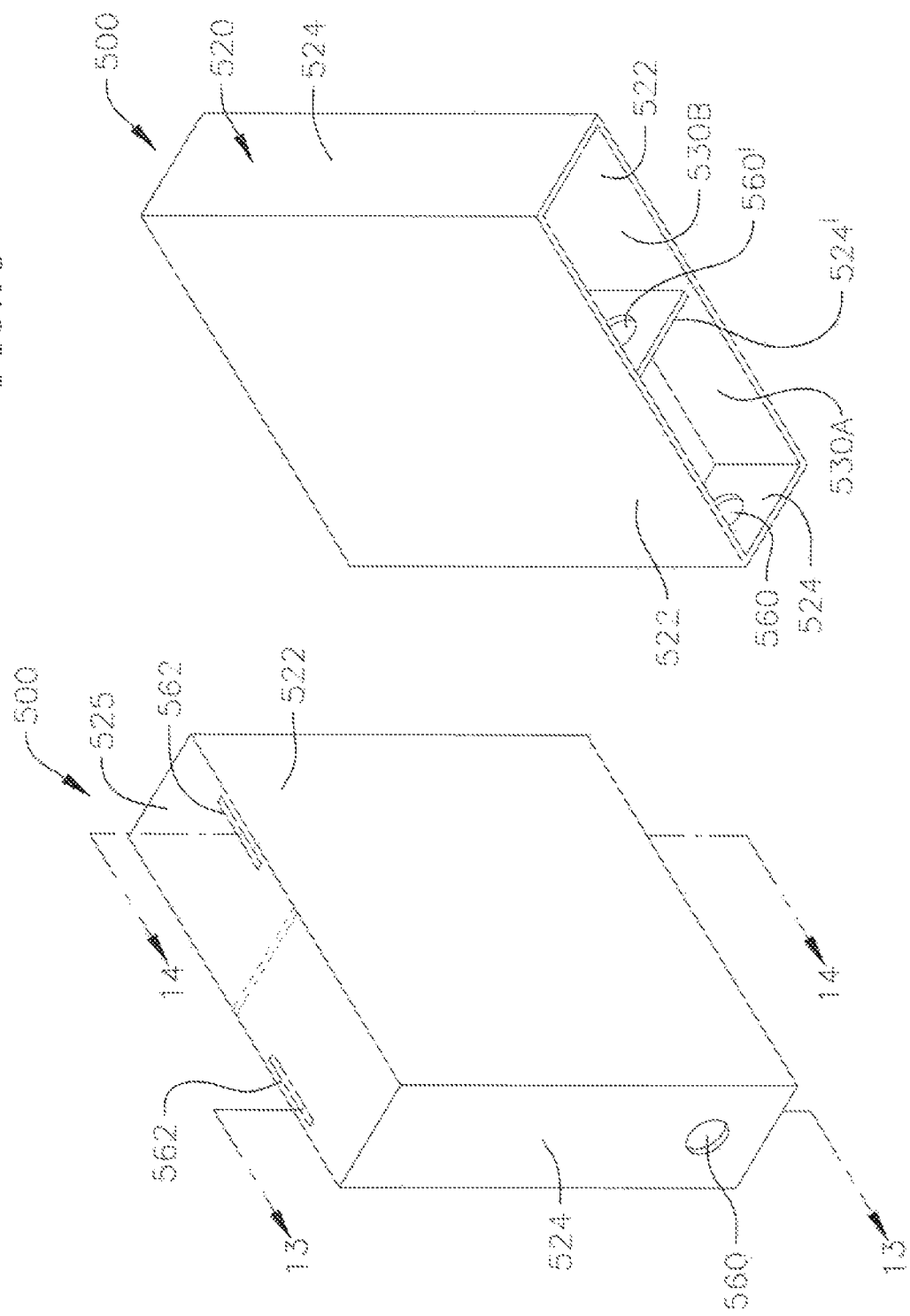

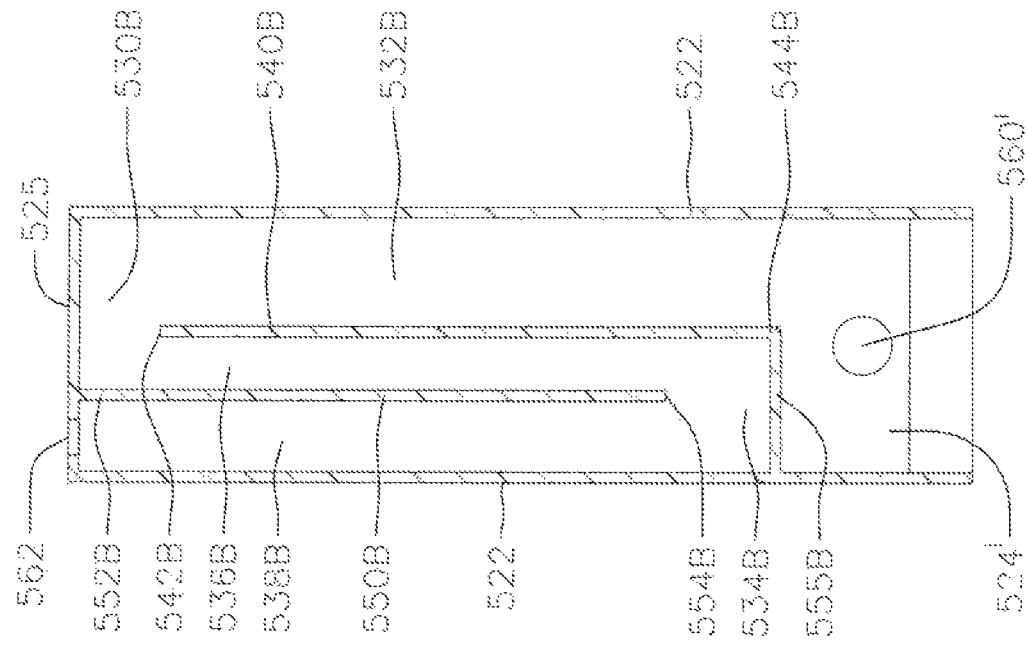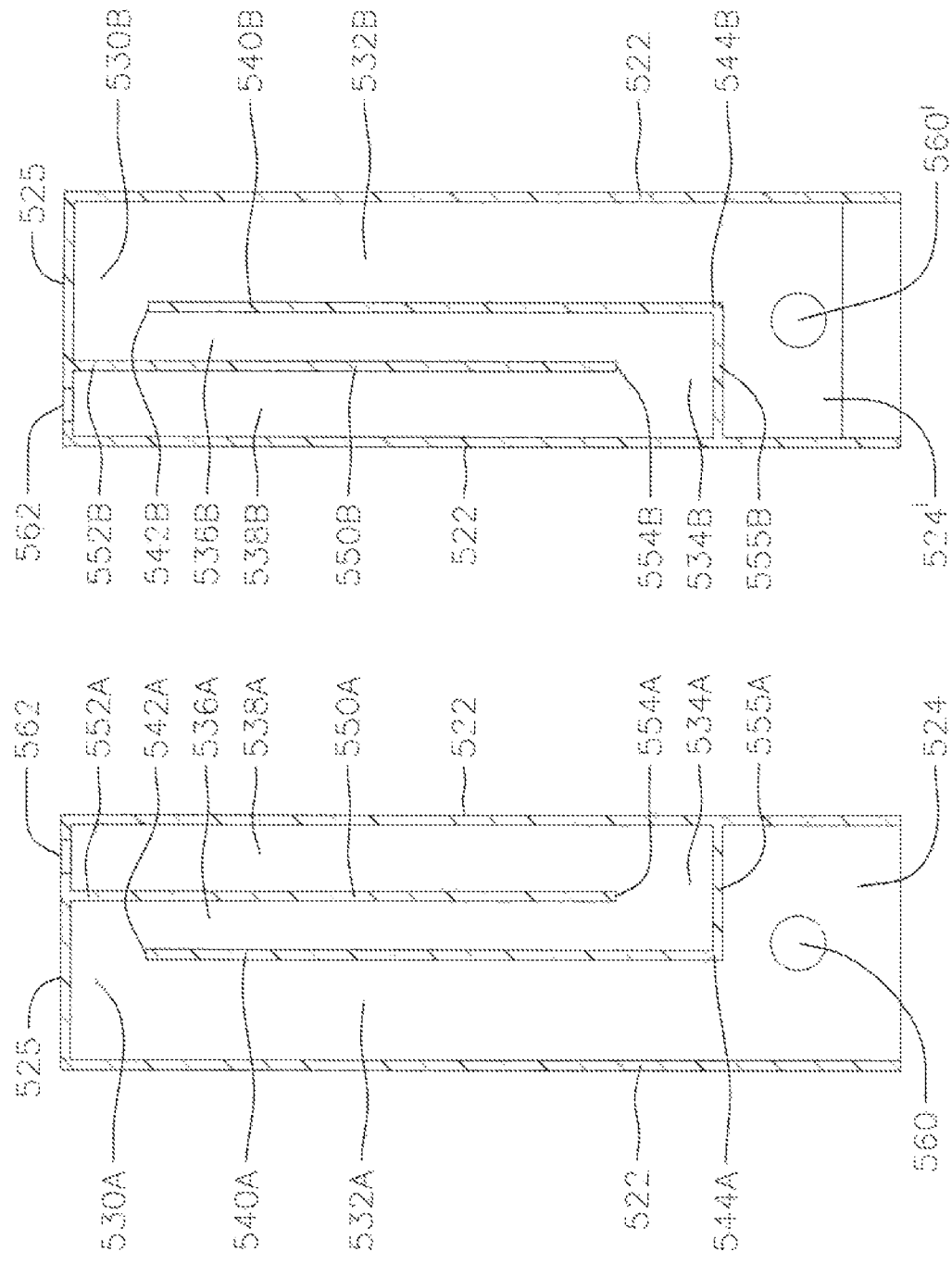

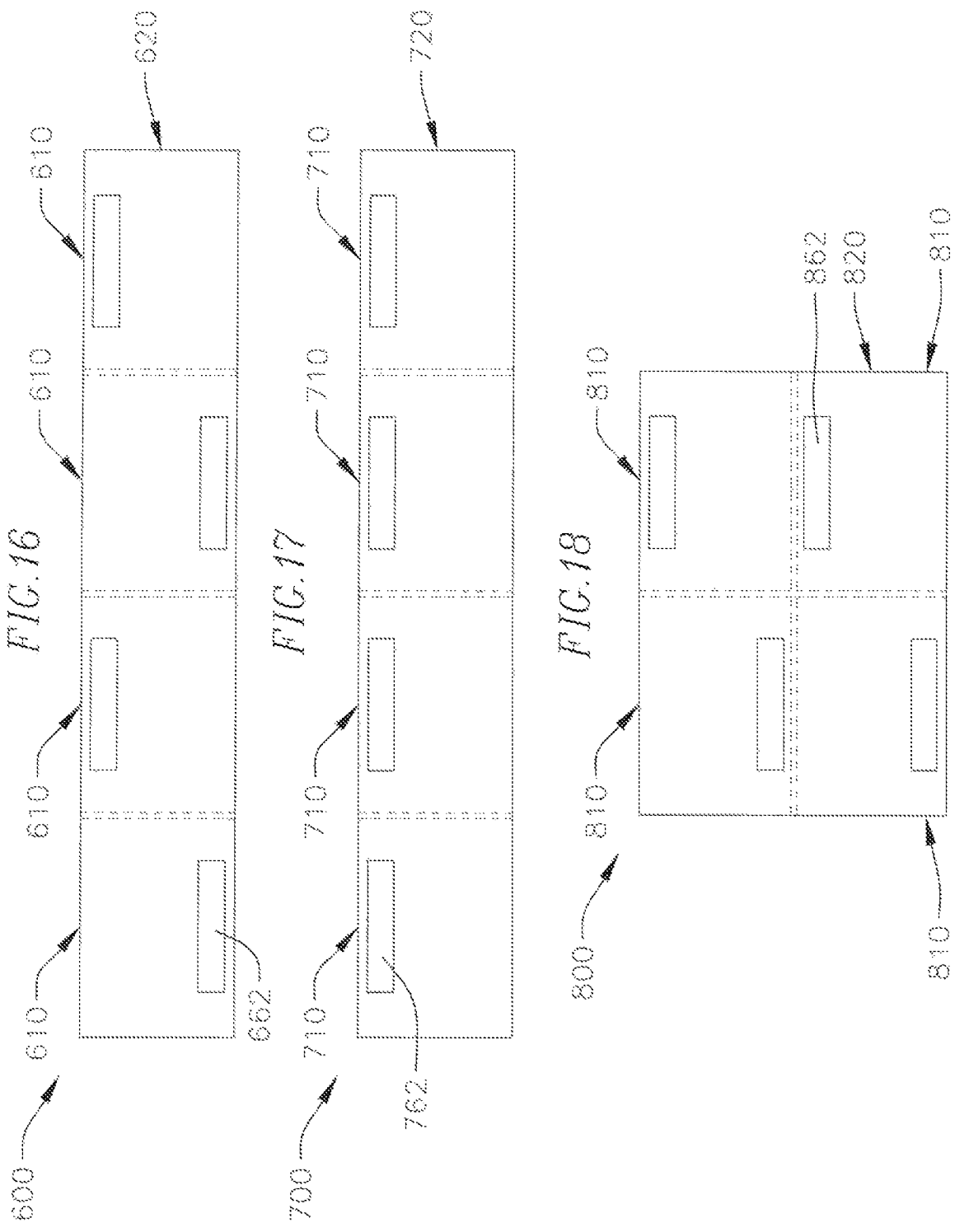

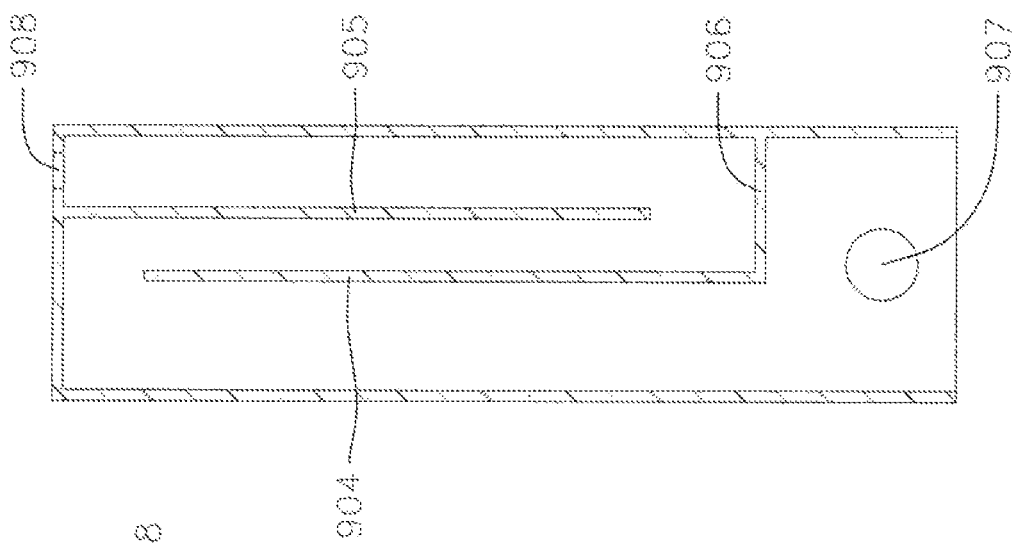
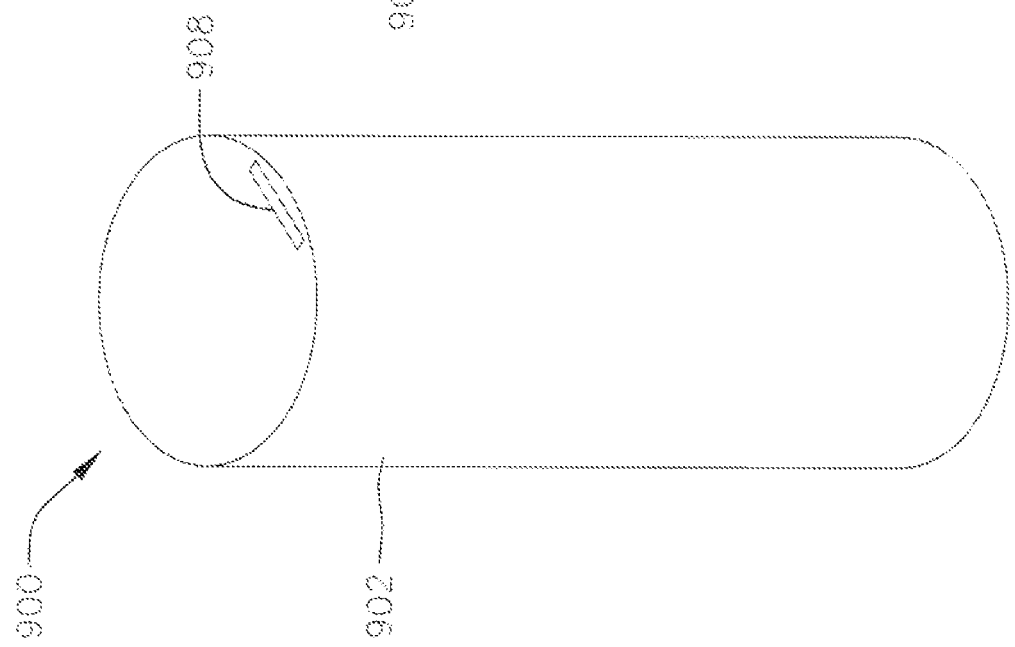

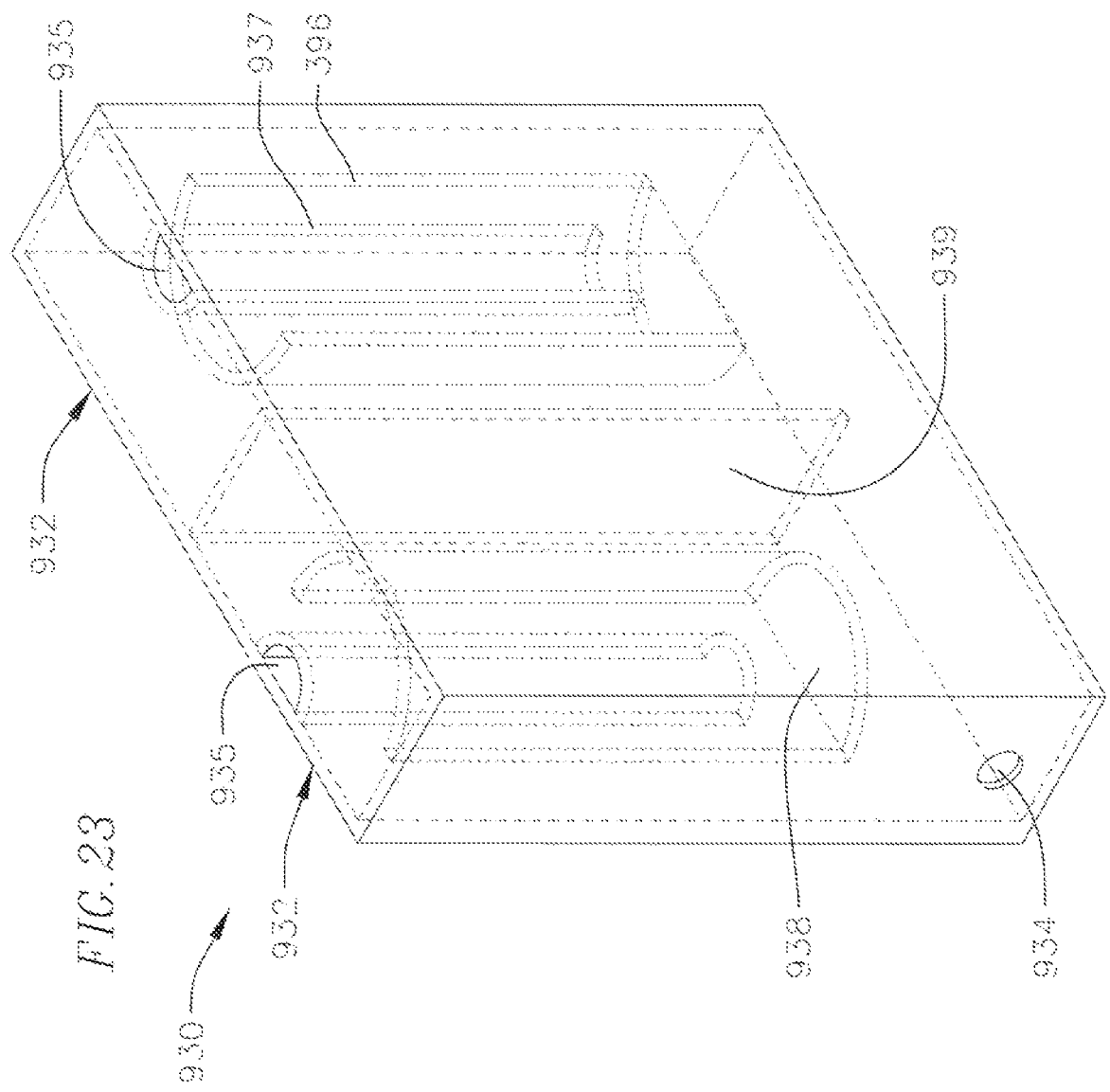

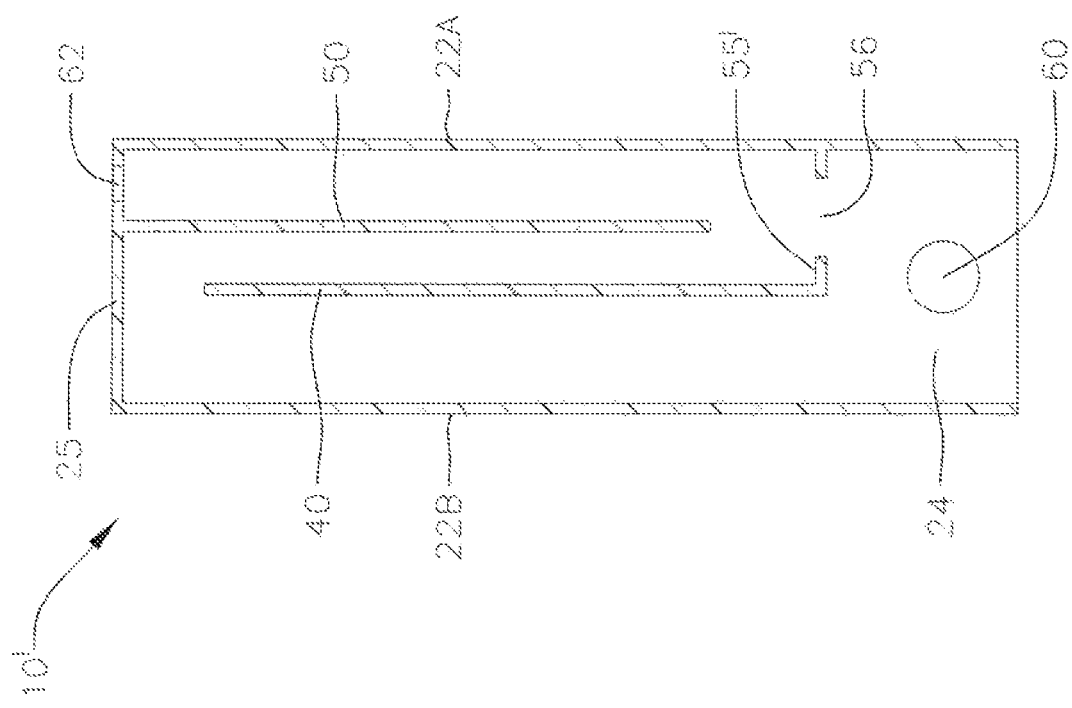

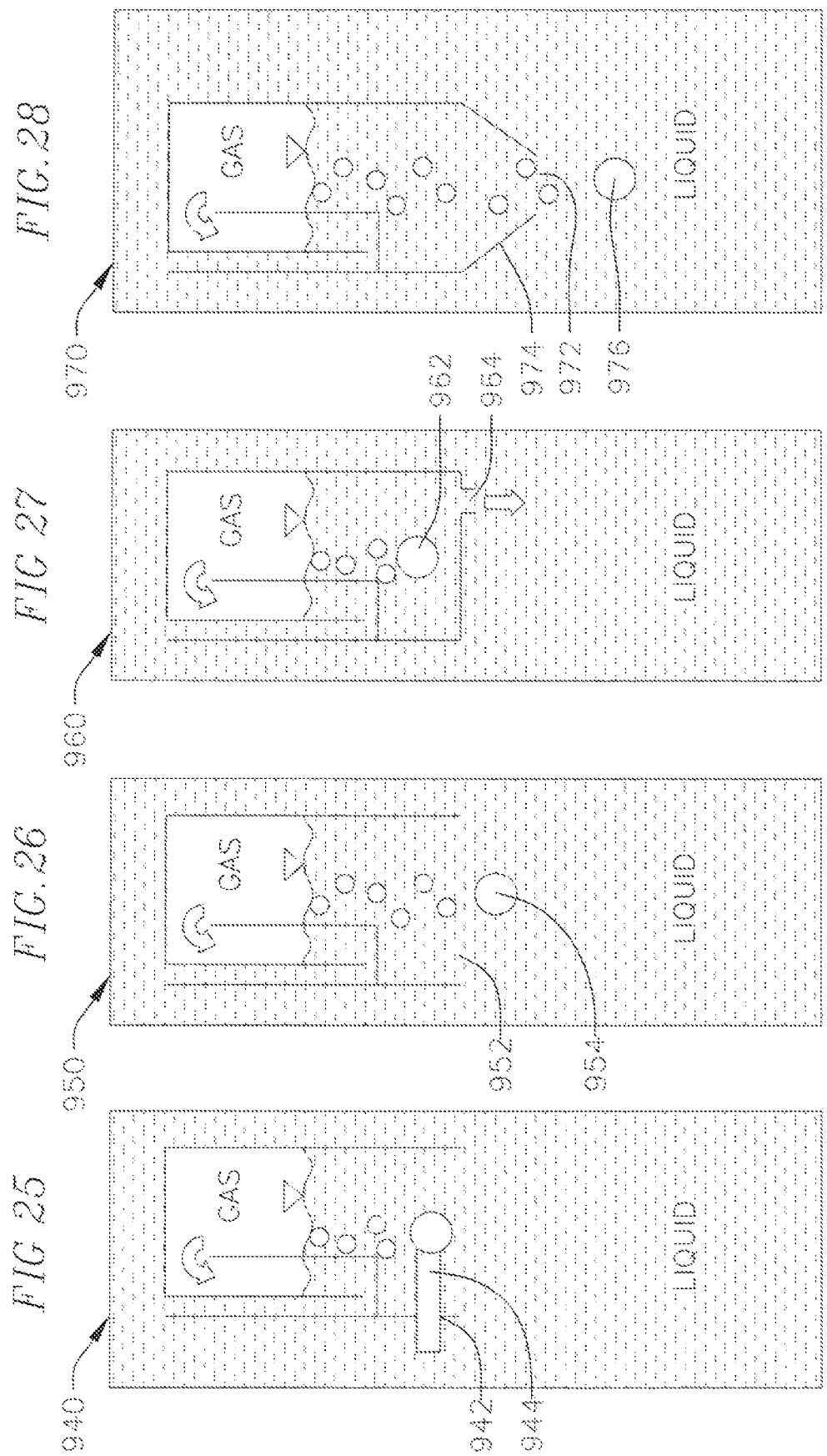

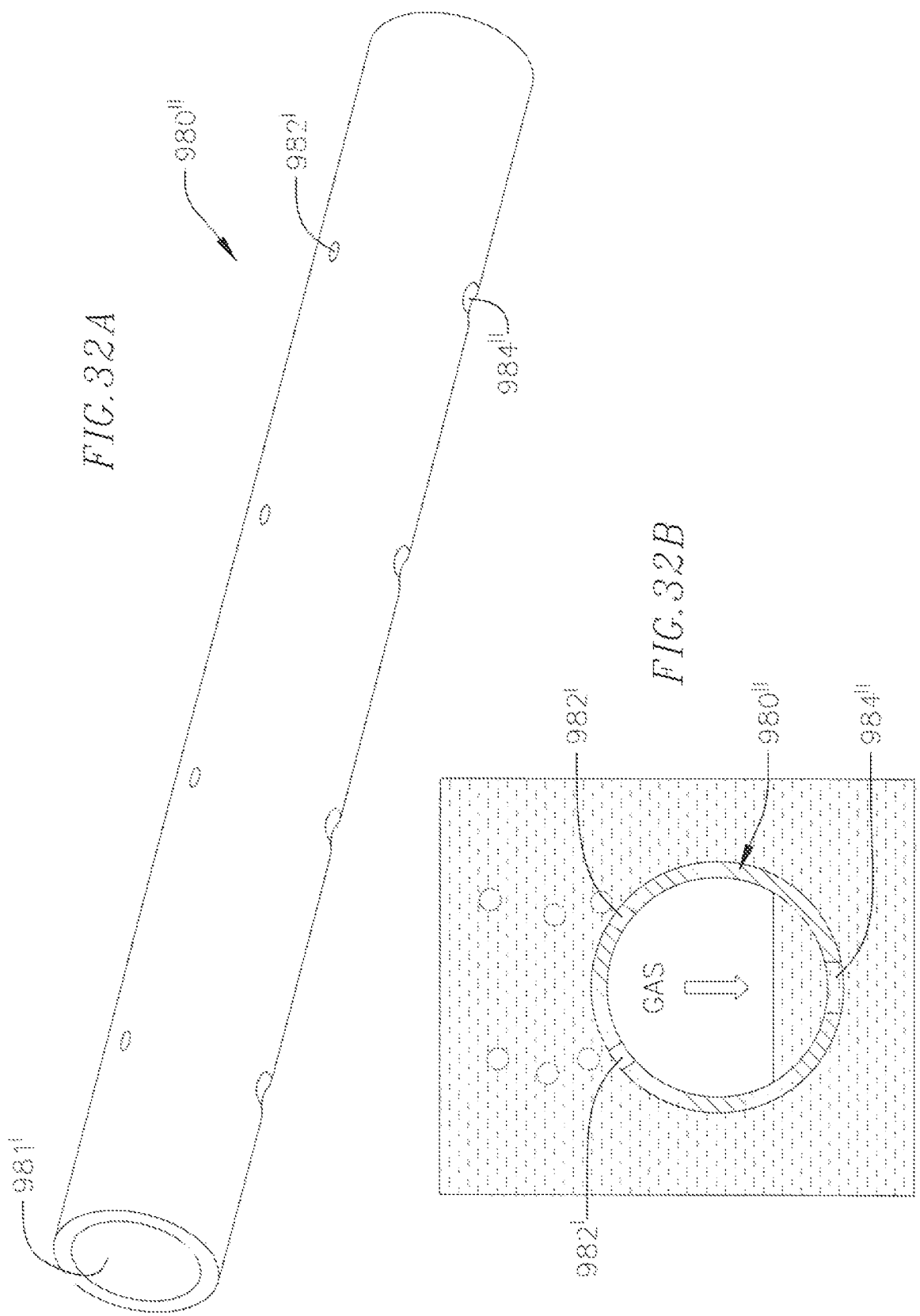

AERATOR DEVICE, FILTER SYSTEM INCLUDING AN AERATOR DEVICE, AND METHOD OF AERATING A FILTER USING AN AERATOR DEVICE

CROSS-REFERENCE TO RELATED APPLICATION(S)

This application claims priority to and the benefit of U.S. Provisional Application No. 61/701,476, filed on Sep. 14, 2012 in the United States Patent and Trademark Office, the entire content of which is incorporated herein by reference. This application also claims priority to Korean Application No. 10-2012-0087488, filed on Aug. 9, 2012.

FIELD

Aspects of embodiments of the present invention relate to an aerator device, a filter system including an aerator device, and a method of aerating a filter using an aerator device.

BACKGROUND

A submerged water filter may be configured as a module or cassette including one or more bundles of hollow fiber membranes. Water may be pumped through the fiber membranes for filtering the water in applications such as desalination, water treatment, wastewater treatment, and water reuse. The fiber membranes include pores of various sizes, depending on the application of the filter, through which the water enters into the hollow fiber membrane and filtered particles are blocked due to a size of the particles being larger than that of the pores. Such filtration may be classified as nanofiltration, ultrafiltration, or microfiltration, for example, and typical pore sizes may be between 0.001 µm and 10 µm. In a submerged filter, the fiber membranes may be aerated with bubbles in order to clean the fiber membranes.

Some existing efforts have been made to provide an aerator for cleaning a membrane filter. For example, an aerator for generating randomly pulsed two-phase flow and using the aerator for cleaning membranes is disclosed in U.S. Patent Application Publication No. 2011/0198283 and International Patent Application No. WO 2008/153818, each entitled "Membrane Cleaning with Pulsed Airlift Pump." These references also disclose the aerator being attached to a lower end of a membrane module, and the two-phase fluid flow being ejected into fiber bundles of the module to clean the membranes. Also, in U.S. Patent Application Publication No. 2011/0049047, entitled "Gas Sparger for an Immersed Membrane," discloses an aerator having a conduit for ejecting bubbles into fiber bundles of a filter module. This reference also discloses a cover for redistributing the bubbles. Further, in U.S. Pat. No. 8,038,882, entitled "Intermittent Gas Flow Apparatus and Membrane Separation Apparatus," discloses an aerator having a pipe structure for ejecting bubbles into a filter module. This reference, like the above references, discloses the aerator and the filter module being integrated together.

However, in the above-discussed references, the air supply units have closed chambers before diffusing into a membrane filter, which may reduce a rate of air movement and cause sludge to accumulate in the chamber. Also, in the above-discussed references, the air supply unit is integrated into the filter module and the diffuser and, therefore, may be difficult to apply to different shapes of other filter modules. Further, in the above-discussed references, inside designs of the air supply units have pipe-type structures which may result in a low manufacturability.

SUMMARY

According to an aspect of embodiments of the present invention, an aerator device is a high-efficiency, low-energy aerator. According to another aspect of embodiments of the present invention, an aerator device is an intermittent air bubble-generating device.

According to another aspect of embodiments of the present invention, a filter system includes an aerator device that is a high-efficiency, low-energy aerator.

According to another aspect of embodiments of the present invention, a method of aerating a filter using an aerator device is provided. According to an aspect of embodiments of the present invention, a method of using an aerator device that is a high-efficiency, low-energy aerator to clean a filter is provided.

According to an aspect of embodiments of the present invention, an aerator device includes a chamber that is divided into sections for air storage, air retaining, and air bubble flow. Air entering the device is held for a certain period of time and then released within a short period of time through an opening at a top side plate. According to an aspect of embodiments of the present invention, the released air provides a high air scouring effect for cleaning a filter, such as a membrane filter, with low air consumption.

According to an embodiment of the present invention, an aerator device includes: a housing including at least one side wall, and a top wall connected to the at least one side wall to define an interior cavity of the housing; a first plate in the interior cavity and extending from an upper end to a lower end, the first plate defining a first cavity portion and a second cavity portion of the interior cavity, the upper end being spaced apart from the top wall to define a first opening, the first cavity portion and the second cavity portion being in communication with each other through the first opening; and a second plate in the interior cavity and extending from an upper end to a lower end, the second plate being between the first plate and a first side wall of the at least one side wall and defining a first chamber and a second chamber of the second cavity portion, the upper end of the second plate being connected to the top wall, the first chamber and the second chamber being in communication with each other below the lower end of the second plate, the housing having an inlet opening in communication with the first cavity portion, and an outlet opening through the top wall and in communication with the second chamber.

In one embodiment, the first plate and the second plate are substantially straight.

In one embodiment, the at least one side wall includes a pair of first opposing side walls, and a pair of second opposing side walls connecting the first opposing side walls, the first side wall of the at least one side wall includes a first side wall of the first opposing side walls, and the first plate and the second plate extend from a first side wall of the second opposing side walls to a second side wall of the second opposing side walls.

The first plate and the second plate may extend substantially parallel to the second plate.

The outlet opening may be a slot extending substantially parallel to the first opposing side walls.

In one embodiment, the aerator device further includes a third plate connecting the lower end of the first plate and the first side wall of the at least one side wall, the third plate being spaced apart from the lower end of the second plate to define a second opening, the first chamber and the second chamber being in communication with each other through the second opening. The third plate may have an opening therethrough.

In one embodiment, the aerator device is configured to be submerged in a liquid medium and to intermittently release gas bubbles from the outlet opening when a gas is supplied into the first cavity portion through the inlet opening at a substantially constant rate.

According to another embodiment of the present invention, a filter system includes: a filter; and an aerator device arranged below the filter, the aerator device including a housing including at least one side wall, and a top wall connected to the at least one side wall to define an interior cavity of the housing; a first plate in the interior cavity and extending from an upper end to a lower end, the first plate defining a first cavity portion and a second cavity portion of the interior cavity, the upper end being spaced apart from the top wall to define a first opening, the first cavity portion and the second cavity portion being in communication with each other through the first opening; and a second plate in the interior cavity and extending from an upper end to a lower end, the second plate being between the first plate and a first side wall of the at least one side wall and defining a first chamber and a second chamber of the second cavity portion, the upper end of the second plate being connected to the top wall, the first chamber and the second chamber being in communication with each other below the lower end of the second plate, the housing having an inlet opening in communication with the first cavity portion, and an outlet opening through the top wall and in communication with the second chamber, and the filter system is submergible in a liquid medium.

In one embodiment, the at least one side wall includes a pair of first opposing side walls, and a pair of second opposing side walls connecting the first opposing side walls, the first side wall of the at least one side wall includes a first side wall of the first opposing side walls, and the first plate and the second plate extend substantially straight from a first side wall of the second opposing side walls to a second side wall of the second opposing side walls.

The first plate and the second plate may extend substantially parallel to the first opposing side walls, and the outlet opening may be a slot extending substantially parallel to the second plate.

In one embodiment, the filter includes a fiber membrane filter, and the filter system further includes a pump to flow the liquid medium through the fiber membrane filter.

In one embodiment, the filter includes a plurality of filter modules, and the aerator device includes a plurality of aerator devices, a respective aerator device of the plurality of aerator devices being arranged below each filter module of the plurality of filter modules.

In one embodiment, each of the respective aerator devices has a respective outlet opening, and the respective aerator devices are spaced apart from one another in a first direction, and the outlet openings of adjacent aerator devices of the respective aerator devices are offset relative to one another in a second direction perpendicular to the first direction and in an alternating manner.

According to another embodiment of the present invention, a method of aerating a filter using an aerator device having an inlet opening and an outlet opening includes: providing the aerator device including a housing including at least one side wall, and a top wall connected to the at least one side wall to define an interior cavity of the housing; a first plate in the interior cavity and extending from an upper end to a lower end, the first plate defining a first cavity portion and a second cavity portion of the interior cavity, the upper end being spaced apart from the top wall to define a first opening, the first cavity portion and the second cavity portion being in communication with each other through the first opening; and a second plate in the interior cavity and extending from an upper end to a lower end, the second plate being between the first plate and a first side wall of the at least one side wall and defining a first chamber and a second chamber of the second cavity portion, the upper end of the second plate being connected to the top wall, the first chamber and the second chamber being in communication with each other below the lower end of the second plate, the housing having the inlet opening in communication with the first cavity portion, and the outlet opening through the top wall and in communication with the second chamber; submerging the filter and the aerator device in a liquid medium; arranging the aerator device below the filter; and supplying a gas to the interior cavity of the aerator device.

In one embodiment, the at least one side wall includes a pair of first opposing side walls, and a pair of second opposing side walls connecting the first opposing side walls, the first side wall of the at least one side wall includes a first side wall of the first opposing side walls, and the first plate and the second plate extend substantially straight from a first side wall of the second opposing side walls to a second side wall of the second opposing side walls.

In one embodiment, the filter includes a plurality of filter modules, and the aerator device includes a plurality of aerator devices, and arranging the aerator device below the filter includes arranging a respective aerator device of the plurality of aerator devices below each filter module of the plurality of filter modules.

In one embodiment, each of the respective aerator devices has a respective outlet opening, and arranging the respective aerator devices includes spacing the respective aerator devices apart from one another in a first direction, and offsetting the outlet openings of adjacent aerator devices of the respective aerator devices relative to one another in a second direction perpendicular to the first direction and in an alternating manner.

In one embodiment, arranging the aerator device below the filter includes spacing the aerator device apart from the filter.

In one embodiment, supplying the gas to the aerator device includes supplying the gas at a substantially constant rate.

The method may further include flowing the liquid medium through the filter.

According to an aspect of embodiments of the present invention, an aerator device is configured having high efficiency, simplicity, compactness, and low resistance in a flow channel.

According to another aspect of embodiments of the present invention, an aerator device is configured such that erupted gas bubbles directly and effectively scour a filter, such as a membrane filter, to utilize the initial energy of the gas bubbles by reducing redistribution of the gas bubbles.

According to another aspect of embodiments of the present invention, an aerator device is used to clean a filter, such as a membrane filter, and achieves high cleaning efficiency with low energy by converting a continuous gas supply into intermittent gas bubbles in a simple divided chamber.

According to another aspect of embodiments of the present invention, an aerator device is used to aerate a filter, such as a submersed membrane filter module, and provide effective aeration from an air supply unit while reducing an amount of air used and a cost of operation.

According to another aspect of embodiments of the present invention, an aerator device has large channel areas, such that blockage of the aerator device may be prevented or reduced.

According to another aspect of embodiments of the present invention, an aerator device does not have a closed chamber, such that accumulation of sludge is reduced, thereby resulting in a more stable operation for a longer period of time.

According to another aspect of embodiments of the present invention, a configuration of an aerator can be combined and/or expanded in series or in parallel to correspond to and efficiently aerate any of various configurations of a filter. An aerator device according to an embodiment of the present invention may have a generally rectangular box-like shape, such that a plurality of the aerator devices may be stacked or otherwise coupled or configured together such that an aerator device may be configured to correspond to and efficiently aerate a filter having any of various configurations.

According to another aspect of embodiments of the present invention, an aerator device has a simple structure including straight panels, such that manufacturability is improved and cost may be reduced.

According to another aspect of embodiments of the present invention, direct diffusion of air bubbles into a filter, such as a membrane bundle, provides a fast rate of air movement and higher scouring efficiency, thereby lowering air consumption, energy consumption, and operating cost.

BRIEF DESCRIPTION OF THE DRAWINGS

The accompanying drawings, together with the specification, illustrate some exemplary embodiments of the present invention, and, together with the description, serve to explain principles and aspects of the present invention.

FIG. 1 is a perspective view of an aerator device according to an embodiment of the present invention.

FIG. 2 is a cross-sectional view of the aerator device of FIG. 1, taken along the line 2-2.

FIGS. 3A to 3E illustrate stages of intermittent gas bubble generation of the aerator device of FIG. 1.

FIG. 7 is a perspective view of an aerator device according to another embodiment of the present invention.

FIG. 9 is a bottom perspective view of the aerator device of FIG. 7.

FIG. 12 is a perspective view of an aerator device according to another embodiment of the present invention.

FIG. 13 is a cross-sectional view of the aerator device of FIG. 12, taken along the line 13-13.

FIG. 14 is a cross-sectional view of the aerator device of FIG. 12, taken along the line 14-14.

FIG. 15 is a bottom perspective view of the aerator device of FIG. 12.

FIG. 16 is a top schematic view of an aerator device according to another embodiment of the present invention.

FIG. 17 is a top schematic view of an aerator device according to another embodiment of the present invention.

FIG. 18 is a top schematic view of an aerator device according to another embodiment of the present invention.

FIGS. 19A and 19B are perspective and cross-sectional views, respectively, of an aerator device according to another embodiment of the present invention.

FIG. 23 is a perspective view of an aerator device according to another embodiment of the present invention.

FIG. 24 is a cross-sectional view of an aerator device according to another embodiment of the present invention.

FIGS. 25 to 28 are schematic cross-sectional views of aerator devices according to various embodiments of the present invention.

FIGS. 29 to 32B are schematic views of gas inlet portions of aerator devices according to various embodiments of the present invention.

DETAILED DESCRIPTION

Figure 4:
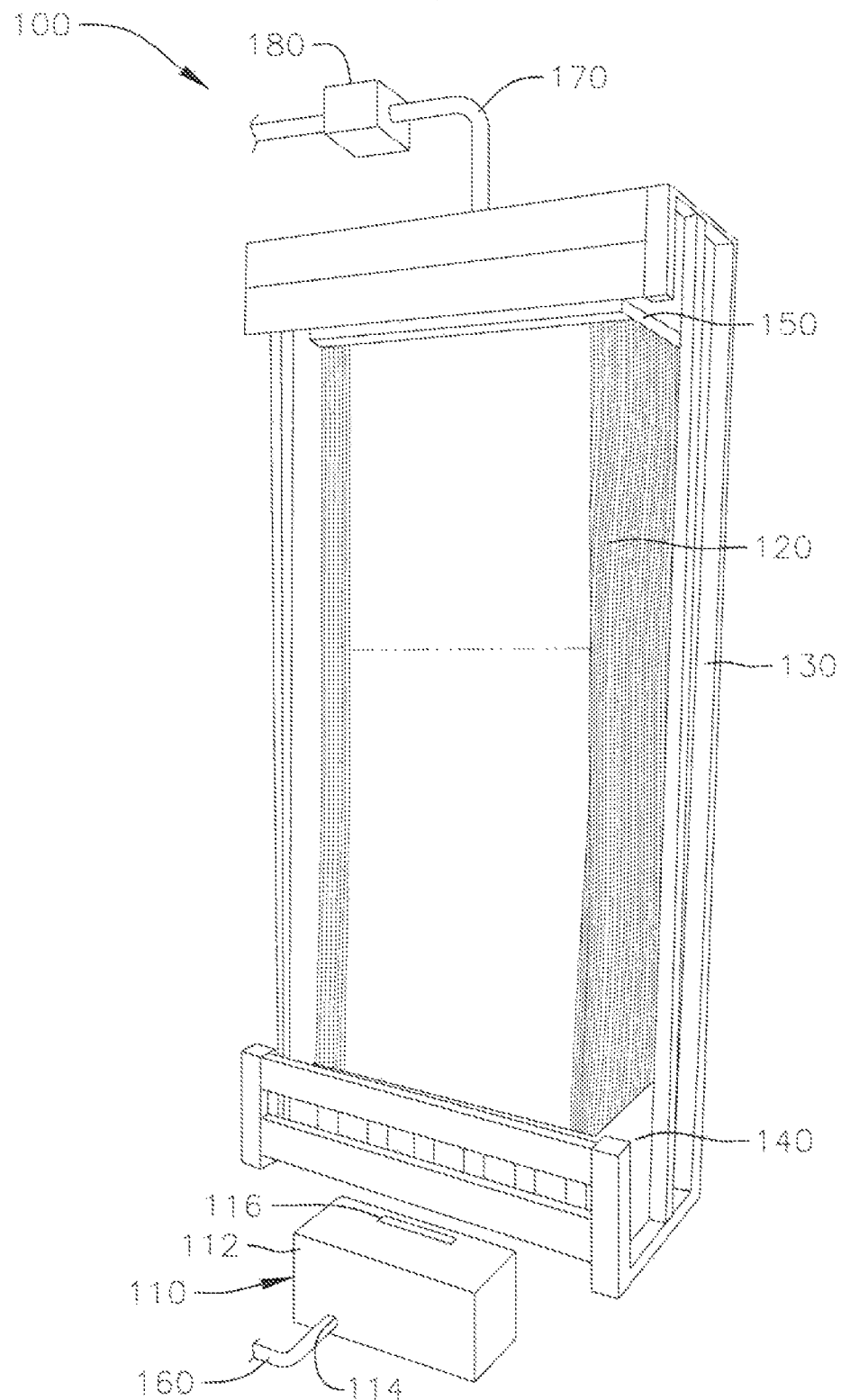
FIG. 4 is a perspective view of a filter system including an aerator device according to an embodiment of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In the drawings, elements or features may be exaggerated, omitted, or schematically illustrated for convenience and clarity of description, and sizes thereof do not necessarily fully reflect actual sizes. Also, in the description of the elements, where an element is referred to as being "on" or "under" another element, the element may be directly on or under the other element, or indirectly on or under the other element with intervening elements. Further, terms such as "on" or "under" may be described with respect to the drawings, but are not intended to be limiting as pertains to orientation. Further, descriptions of features or aspects within each embodiment should typically be considered as available for other similar features or aspects in other embodiments.

Referring to FIGS. 1 and 2, an aerator device 10 according to an embodiment of the present invention includes a housing 20 having a pair of first opposing side walls 22A, 22B, a pair of second opposing side walls 24 connecting the first opposing side walls 22A, 22B, and a top wall 25 connecting the first and second opposing side walls 22A, 22B, 24 to define an interior cavity 30 of the housing 20. In one embodiment, the first opposing side walls 22A, 22B are generally parallel to each other, and the second opposing side walls 24 are generally parallel to each other and generally perpendicular to the first opposing side walls 22A, 22B, such that the housing 20 has a generally box-like shape. The housing 20 may be formed of a metal, a plastic, a fiberglass, a ceramic, or any other suitable material.

The aerator device 10 further includes a first plate 40 in the interior cavity 30 and extending from an upper end 42 to a lower end 44, the first plate 40 being between the first opposing side walls 22A, 22B and defining a first cavity portion 32 and a second cavity portion 34 of the interior cavity 30. The upper end 42 of the first plate 40 is spaced apart from the top wall 25 to define an opening 48 (see FIG. 3B) therebetween through which the first cavity portion 32 and the second cavity portion 34 are in communication with each other. The aerator device 10 further includes a second plate 50 in the interior cavity 30 that extends from an upper end 52 to a lower end 54. The second plate 50 is between the first plate 40 and the first side wall 22A and defines a first chamber 36 and a second chamber 38 of the second cavity portion 34. The upper end 52 of the second plate 50 is connected to the top wall 25, and the first chamber 36 and the second chamber 38 are in communication with each other below the lower end 54 of the second plate 50. In one embodiment, the aerator device 10 further includes a third plate 55 connecting the lower end 44 of the first plate 40 and the first side wall 22A. The third plate 55 is spaced apart from the lower end 54 of the second plate 50 to define an opening 58 (see FIG. 3A) below the lower end 54 of the second plate 50 through which the first chamber 36 and the second chamber 38 are in communication with each other. The first plate 40, the second plate 50, and the third plate 55 may be formed of a metal, a plastic, a fiberglass, a ceramic, or any other suitable material.

In embodiments of the present invention, the first plate 40 and the second plate 50 are substantially straight, such that the aerator device 10 is simple and easily manufactured. Also, in one embodiment, the first plate 40 and the second plate 50 extend from one of the second opposing side walls 24 to the other of the second opposing side walls 24. Further, the first plate 40 and the second plate 50 may extend generally parallel to the first opposing side walls 22A, 22B.

The housing 20, in one embodiment, may have an inlet opening 60, such as through at least one side wall of the first or second opposing side walls 22A, 22B, 24. In one embodiment, for example, the inlet opening 60 may be formed in the one of the second side walls 24. However, the present invention is not limited thereto, and, in other embodiments, the inlet opening may be at another location, such as in one of the first side walls 22A or at a bottom portion of the housing, such that the inlet opening is in communication with the first cavity portion 32. The inlet opening 60 is an inlet through which a gas, such as air, may be flowed into the first cavity portion 32. The housing 20 also has an outlet opening 62 formed through the top wall 25 and in communication with the second chamber 38 for releasing gas bubbles out of the aerator device 10 from the second chamber 38. The outlet opening 62, in one embodiment, may be a slot extending generally parallel to the first opposing side walls 22A, 22B.

With reference to FIGS. 3A to 3E, stages of intermittent gas bubble generation of the aerator device 10 are shown. The aerator device 10 is submerged in a liquid medium, such as water that is to be filtered.

Referring to FIG. 3A, a gas 70 is supplied to the interior cavity 30 of the aerator device 10 through the inlet opening 60. The inlet opening 60 may be directly connected to the housing 20, such as passing through at least one of the first opposing side walls 22A, 22B of the housing 20. However, the present invention is not limited thereto, and, in other embodiments, the inlet opening may be at another portion of the housing such as an open bottom portion, such as described later herein with respect to FIG. 26, for example. In one embodiment, the gas may be air. However, the present invention is not limited thereto and, in other embodiments, the gas may be any other suitable gas. The gas 70, in one embodiment, may be supplied continuously at a substantially constant rate.

Next, referring to FIG. 3B, as the amount of the gas 70 in the interior cavity 30 increases, the gas 70 rises to the top of the first cavity portion 32 and the first chamber 36 of the second cavity portion 34, thereby causing a liquid level in the first cavity portion 32 and the first chamber 36 to be lowered. That is, the first cavity portion 32 is a section of gas storage, and the first chamber 36 is a section of gas retaining.

Referring to FIG. 3C, when the liquid level in the first chamber 36 becomes lower than the lower end 54 of the second plate 50, the gas 70 moves from the first chamber 36 to the second chamber 38 through the opening 58 below the lower end 54 of the second plate 50. The gas 70 then rises through the second chamber 38 and is released as gas bubbles 72 through the outlet opening 62. In a short amount of time, most of the gas 70 in the first chamber 36 and the first cavity portion 32 is released through the outlet opening 62. That is, the second chamber 38 is a section of gas bubble flow.

Referring to FIG. 3D, the gas 70 continues to flow out through the second chamber 38 via a siphon effect, and the liquid level in the first cavity portion 32 rises.

Finally, referring to FIG. 3E, the liquid level rises in the first cavity portion 32 until it reaches the top 42 of the first wall 40 acting as a weir, and then flows over the top 42 of the first wall 40 and into the first chamber 36. As described above with respect to FIG. 3A, the gas 70 being supplied into the interior cavity 30 through the inlet opening 60 again rises to the top of the first cavity portion 32 and the first chamber 36, and again causes the liquid level in the first cavity portion and the first chamber 36 to be lowered. These stages of gas bubble generation of the aerator device 10 are repeated, thereby producing intermittent short periods of gas bubble generation.

Figure 5:
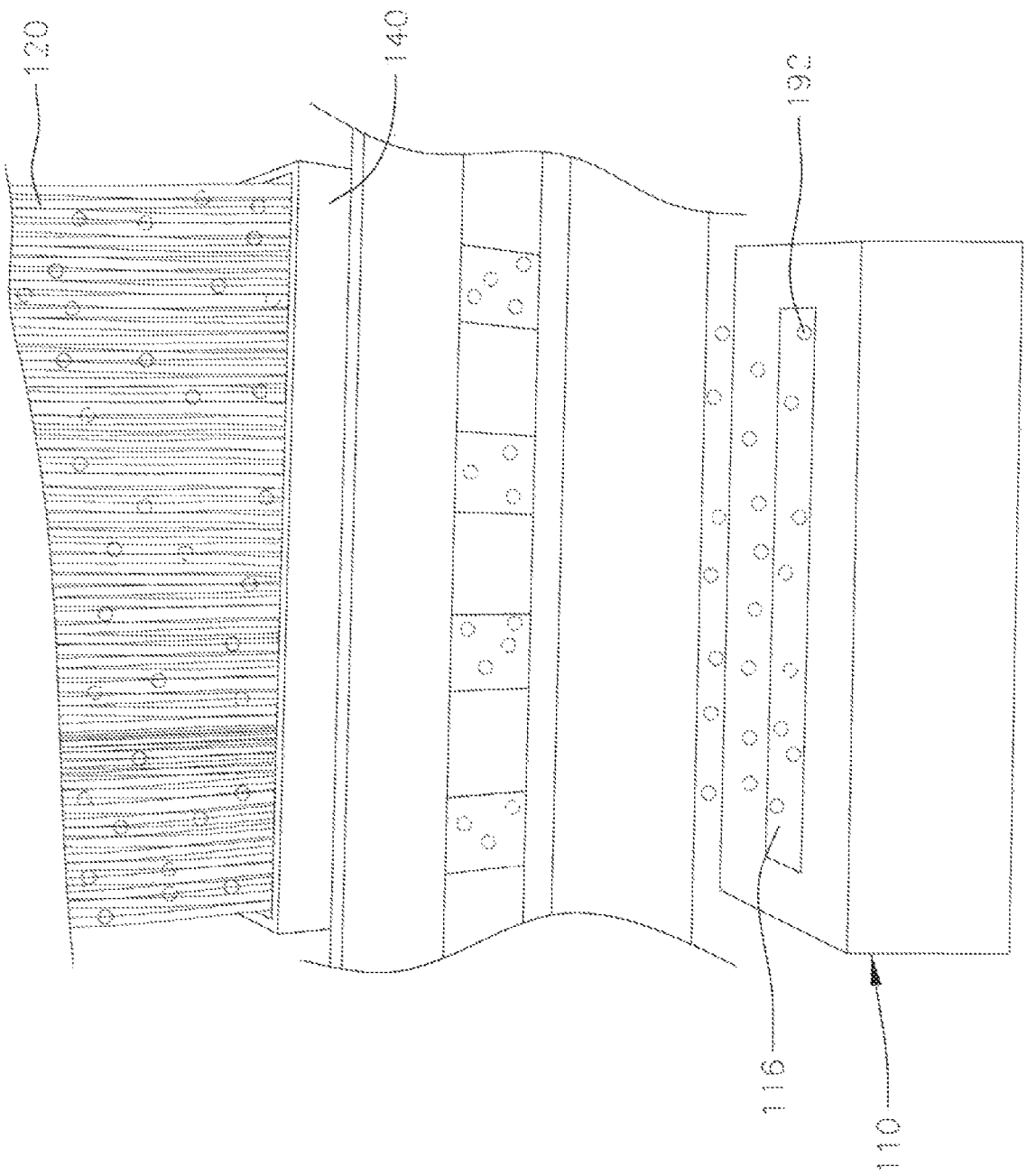
FIG. 5 is a perspective view of a lower portion of the filter system including an aerator device of FIG. 4.

With reference to FIGS. 4 and 5, a filter system 100 according to an embodiment of the present invention includes an aerator device 110 described above. In one embodiment, the aerator device 110 may have a same or substantially same structure and function of intermittent gas bubble generation as the aerator device 10 described above. However, the present invention is not limited thereto and, in other embodiments, the filter system 100 may include an aerator device according to another embodiment of the present invention.

According to an embodiment of the present invention, the filter system 100 includes the aerator device 110 and a filter 120. The aerator device 110, in one embodiment, is arranged below the filter 120 such that gas bubbles 192 released from the aerator device 110 may rise around and between elements of the filter 120 in order to clean surfaces of the filter 120. The aerator device 110, in one embodiment, is separate and spaced apart from the filter 120, such that the aerator device 110 may be positioned at a location relative to the filter 120 that provides efficient cleaning of the filter 120. In one embodiment, the aerator device 110 may be arranged in a gap between sub-modules or elements of the filter 120. The aerator device 110 includes a housing 112, an inlet opening 114 to flow a gas into an interior cavity of the housing 112, and an outlet opening 116 to release the gas bubbles 192 upward toward the filter 120. The filter 120, in one embodiment, may be a membrane filter made up of one or more fiber bundles, such as hollow fibers, flat sheets, or other types of membranes. The filter 120, in another embodiment, may be a type other than a membrane, such as a sand filter. However, embodiments of the present invention are not limited thereto, and, in other embodiments, the filter 120 may include any other suitable filter device to be aerated by the aerator device 110. Further, the filter system 100 may be submerged in a liquid medium to be filtered. The liquid medium may be any liquid medium to be filtered, such as water, mixed liquor, etc.

In one embodiment, the filter system 100 further includes a frame 130, a lower header 140, and an upper header 150 supporting the filter 120. Further, the filter system 100 includes a gas supply 160 connected to the inlet opening 114 of the aerator device 110 to flow the gas into the interior cavity of the aerator device 110. The inlet opening 114 may be directly connected to the housing 112, such as passing through a side wall of the housing 112, or may be at another portion of the housing, such as a bottom portion of the housing as described later herein with respect to FIG. 26, for example. Further, in one embodiment, the filter system 100 may include a liquid outlet 170 to remove filtered liquid from the filter 120. The liquid outlet 170 may be connected to a pump 180 or other suitable device for flowing the filtered liquid from the filter 120.

Figure 6:
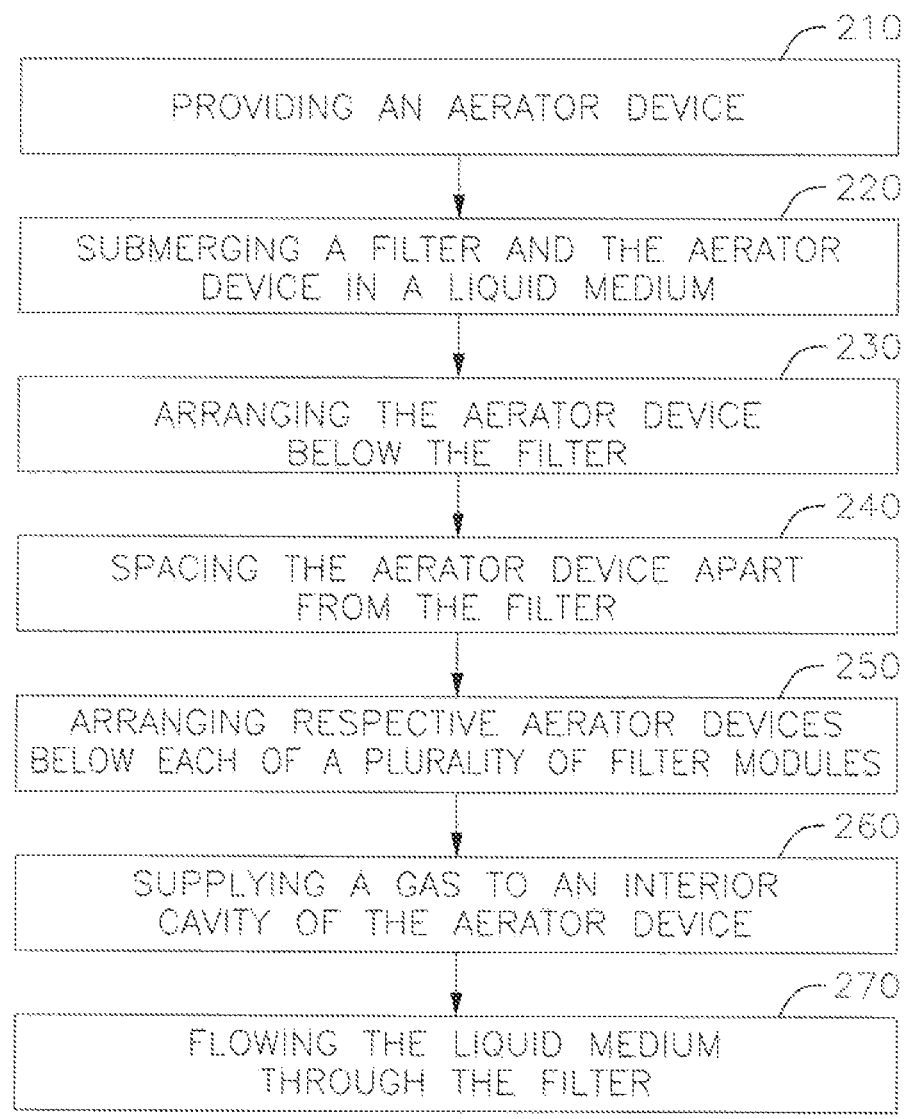
FIG. 6 is a flowchart showing tasks of a method of aerating a filter using an aerator device according to an embodiment of the present invention

With reference to FIG. 6, tasks of a method 200 of aerating a filter using an aerator device are shown. While some tasks of the method 200 are described herein with respect to the aerator devices 10, 300 and the filter systems 100, 400 described above, the method 200, or at least some of the tasks thereof, may be performed using an aerator device and/or a filter system according to another embodiment of the present invention. In one embodiment, for example, the method 200 may be performed to aerate and clean a membrane filter. However, the present invention is not limited thereto and, in other embodiments, another filter may be aerated using an aerator device according to the present invention.

With reference to FIG. 6, in one embodiment, the method 200 includes a task 210 of providing an aerator device. The aerator device used to aerate a filter according to an embodiment of the present invention may be one or more of the aerator devices 10, 110 described above or aerator devices according to other embodiments of the present invention.

The method 200, in one embodiment, further includes a task 220 of submerging a filter and the aerator device in a liquid medium. In one embodiment, the filter assembly 100 including the aerator device 110 described above is submerged in a liquid medium, such as a pond or vessel containing the liquid medium to be filtered. In one embodiment, the liquid medium may be water. However, the present invention is not limited thereto, and, in other embodiments, the liquid medium may be any other desired liquid medium to be filtered using the filter assembly 100. For example, in one embodiment the liquid medium may be mixed liquor in a membrane bioreactor (MBR).

The method 200 according to one embodiment further includes a task 230 of arranging the aerator device below the filter. In one embodiment, as shown in FIGS. 4 and 5, the aerator device 110 is arranged below the filter 120 such that the gas bubbles 192 may contact and aerate surfaces of the filter 120 as the gas bubbles 192 rise in the liquid medium. A position of the aerator device relative to the filter (e.g., a fiber membrane bundle) may be selected in order to provide efficient cleaning of the filter, such as by increasing an amount of contact between the gas bubbles and the surfaces of the filter. In one embodiment, the aerator device 110 may be arranged in a gap between sub-modules or elements of the filter 120.

According to one embodiment, the method 200 further includes a task 240 of spacing the aerator device apart from the filter. As described above, the aerator device 110, in one embodiment, may be separate and spaced apart from the filter 120, such that the aerator device 110 may be positioned at a location relative to the filter 120 that provides efficient cleaning of the filter 120.

The method 200, in one embodiment, further includes a task 250 of arranging respective aerator devices below each of a plurality of filter modules. In one embodiment, as described in further detail later herein with respect to FIGS. 10 and 11, for example, a plurality of aerator devices, or a composite aerator device having a plurality of outlet openings, may be provided and arranged below a plurality of filter modules, such as by arranging each below a respective filter module of a plurality of filter modules. Also, in another embodiment, a plurality of aerator devices, or a composite aerator device having a plurality of outlet openings, may be provided and arranged below one filter module. By using a plurality of aerator devices, efficient cleaning of the filter modules may be obtained, such as by increasing an amount of contact between the gas bubbles and the surfaces of the filter modules.

The method 200, in one embodiment, further includes a task 260 of supplying a gas to an interior cavity of the aerator device. In one embodiment, the gas is supplied to the interior cavity 30 of the aerator device 10 through the inlet opening 60. Further, the gas, which may be air or any other suitable gas, may be supplied from a gas supply, such as the gas supply 160 shown in FIG. 4. The gas, in one embodiment, may be supplied at a substantially constant rate and may also be supplied continuously at the substantially constant rate.

In one embodiment, the method 200 further includes a task 270 of flowing the liquid medium through the filter. That is, the liquid medium may be flowed through and drawn out from the filter (e.g., a membrane fiber filter) to be filtered. In one embodiment, the pump 180 or another suitable device may be used to flow the filtered liquid medium through the filter 120 and through the liquid outlet 170. As described above, the liquid medium ay be any liquid medium to be filtered, such as water, mixed liquor, etc.

While in one embodiment, the method 200 of aerating a filter using an aerator device may include each of the tasks described above and shown in FIG. 6, in other embodiments of the present invention, in a method of aerating a filter using an aerator device, one or more of the tasks described above and shown in FIG. 6 may be absent and/or additional tasks may be performed. Further, in the method 200 of aerating a filter using an aerator device according to one embodiment, the tasks may be performed in the order depicted in FIG. 6. However, the present invention is not limited thereto and, in a method of aerating a filter using an aerator device according to other embodiments of the present invention, the tasks described above and shown in FIG. 6 may be performed in any other suitable sequence.

Figure 8:
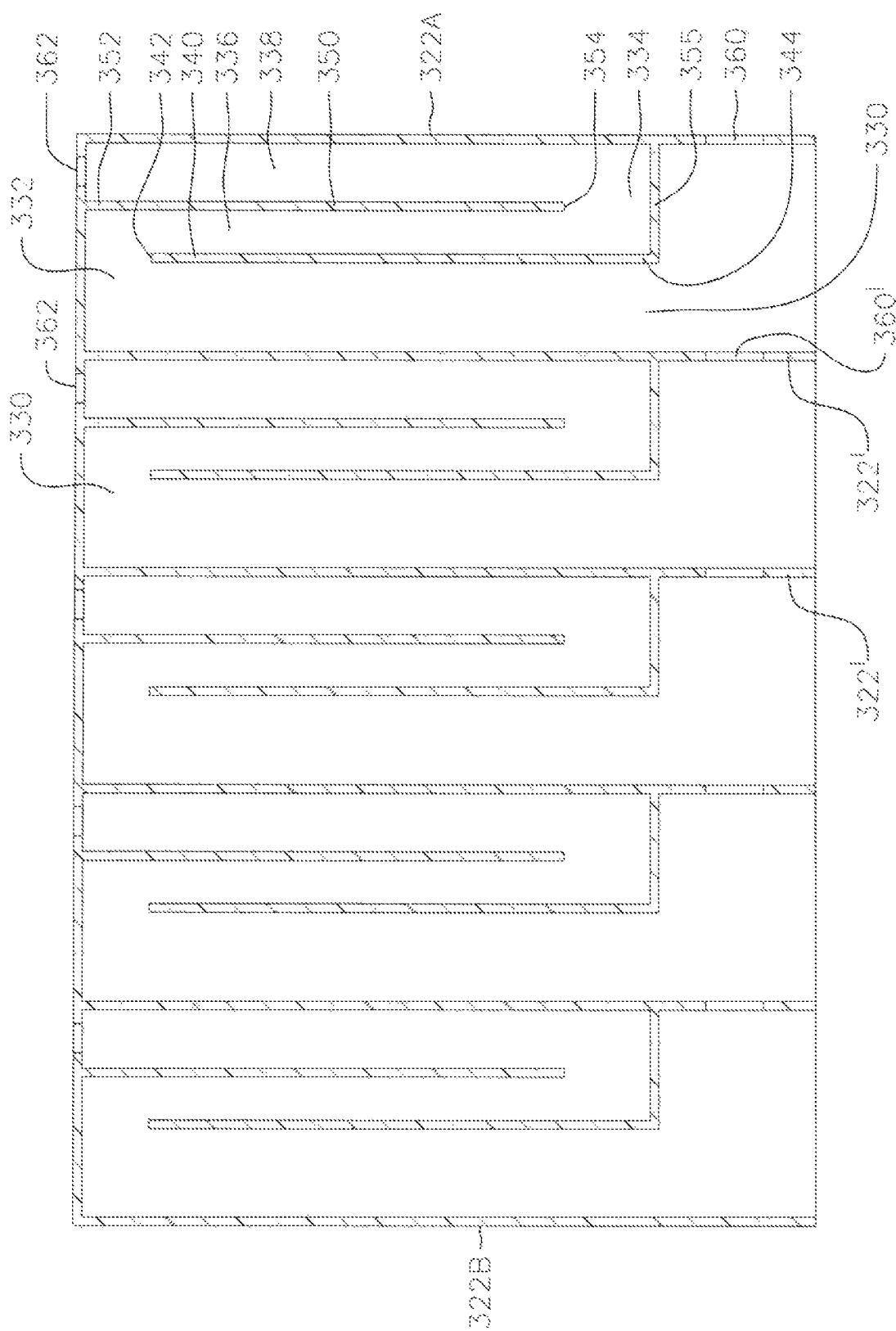
FIG. 8 is a cross-sectional view of the aerator device of FIG. 7, taken along the line 8-8.

With reference to FIGS. 7-9, an aerator device 300 according to another embodiment of the present invention is shown. According to one embodiment, the aerator device 300 includes a plurality of aerator devices 310. In one embodiment, the aerator device 300 is a composite aerator device including an integral housing 320, and the aerator devices 310 are aerator device portions of the composite aerator device. Alternatively, the aerator devices 310 may be separate from one another and may each include an individual housing. While the aerator device 300 is illustrated as having five aerator device portions 310, the present invention is not limited thereto but, rather, may include any other desired number of aerator device portions.

The housing 320, in one embodiment, includes a pair of first opposing side walls 322A, 322B, a pair of second opposing side walls 324 connecting the first opposing side walls 322A, 322B, and a top wall connecting the first and second opposing side walls 322A, 322B, 324 to define an interior cavity of the housing 320. In one embodiment, the first opposing side walls 322A, 322B are generally parallel to each other, and the second opposing side walls 324 are generally parallel to each other and generally perpendicular to the first opposing side walls 322A, 322B, such that the housing 320 has a generally box-like shape. The housing 320 further includes intermediate walls 322' between and generally parallel to the first opposing side walls 322A, 322B. The intermediate walls 322' divide the interior cavity of the housing 320 into a plurality of interior cavities 330 of the respective aerator device portions 310. The housing 320 may be formed of a metal, a plastic, a fiberglass, a ceramic, or any other suitable material.

In one embodiment, each of the aerator device portions 310 includes a first plate 340 in the interior cavity 330 and extending from an upper end 342 to a lower end 344, the first plate 340 being between the first opposing side walls 322A, 322B and defining a first cavity portion 332 and a second cavity portion 334 of the interior cavity 330. The upper end 342 of the first plate 340 is spaced apart from the top wall to define an opening therebetween through which the first cavity portion 332 and the second cavity portion 334 are in communication with each other. The aerator device 310 further includes a second plate 350 in the interior cavity 330 that extends from an upper end 352 to a lower end 354. The second plate 350 is between the first plate 340 and the first side wall 322A and defines a first chamber 336 and a second chamber 338 of the second cavity portion 334. The upper end 352 of the second plate 350 is connected to the top wall, and the first chamber 336 and the second chamber 338 are in communication with each other below the lower end 354 of the second plate 350. In one embodiment, the aerator device 310 further includes a third plate 355 connecting the lower end 344 of the first plate 340 and the first side wall 322A (or a respective one of the intermediate walls 322'). The third plate 355 is spaced apart from the lower end 354 of the second plate 350 to define an opening below the lower end 354 of the second plate 350 through which the first chamber 336 and the second chamber 338 are in communication with each other. The first plate 340, the second plate 350, and the third plate 355 may be formed of a metal, a plastic, a fiberglass, a ceramic, or any other suitable material.

In embodiments of the present invention, the first plate 340 and the second plate 350 are substantially straight, such that the aerator device 300 is simple and easily manufactured. Also, in one embodiment, the first plate 340 and the second plate 350 extend from one of the second opposing side walls 324 to the other of the second opposing side walls 324. Further, the first plate 340 and the second plate 350 may extend generally parallel to the first opposing side walls 322A, 322B.

The housing 320, in one embodiment, may have an inlet opening 360 through at least one side wall of the first or second opposing side walls 322A, 322B, 324. In one embodiment, for example, the inlet opening 360 is formed in the first side wall 322A. However, the present invention is not limited thereto, and, in other embodiments, the inlet opening may be at another location, such as a bottom portion of the housing 320, such that the inlet opening is in communication with the first cavity portion 332. The inlet opening 360 is an inlet through which a gas, such as air, may be flowed into the first cavity portion 332. In one embodiment, one or more of the intermediate walls 322' may have an inlet opening 360' through which the gas may pass between the interior chambers 330 of the adjacent aerator devices 310. The housing 320 also has a plurality of outlet openings 362 formed through the top wall and in communication with the second chamber 338 of respective ones of the aerator devices 310 for releasing gas bubbles out of the aerator devices 310 from the second chamber 338. The outlet openings 362, in one embodiment, may be slots extending generally parallel to the first opposing side walls 322A, 322B.

Figure 10:
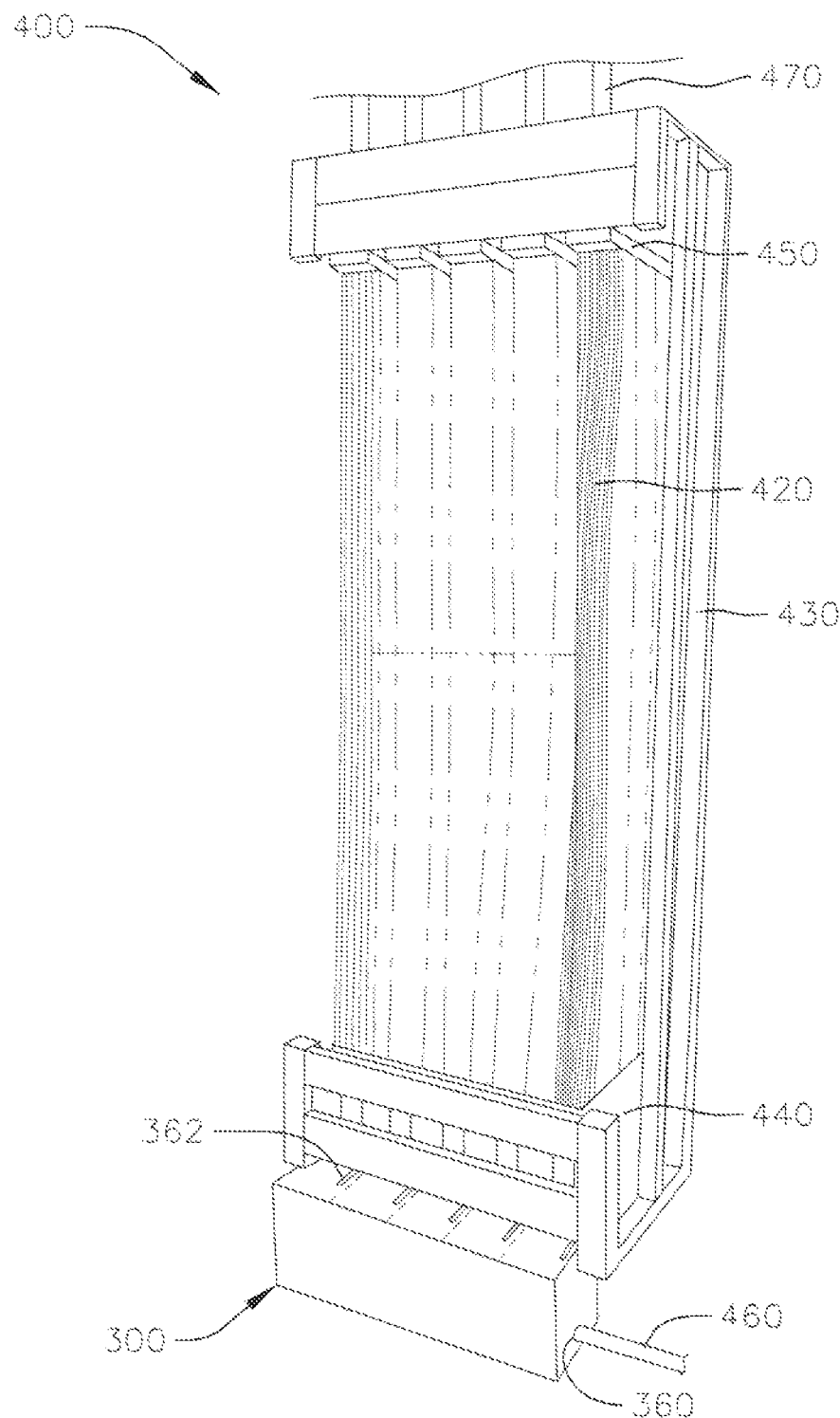
FIG. 10 is a perspective view of a filter system including an aerator device according to another embodiment of the present invention.
Figure 11:
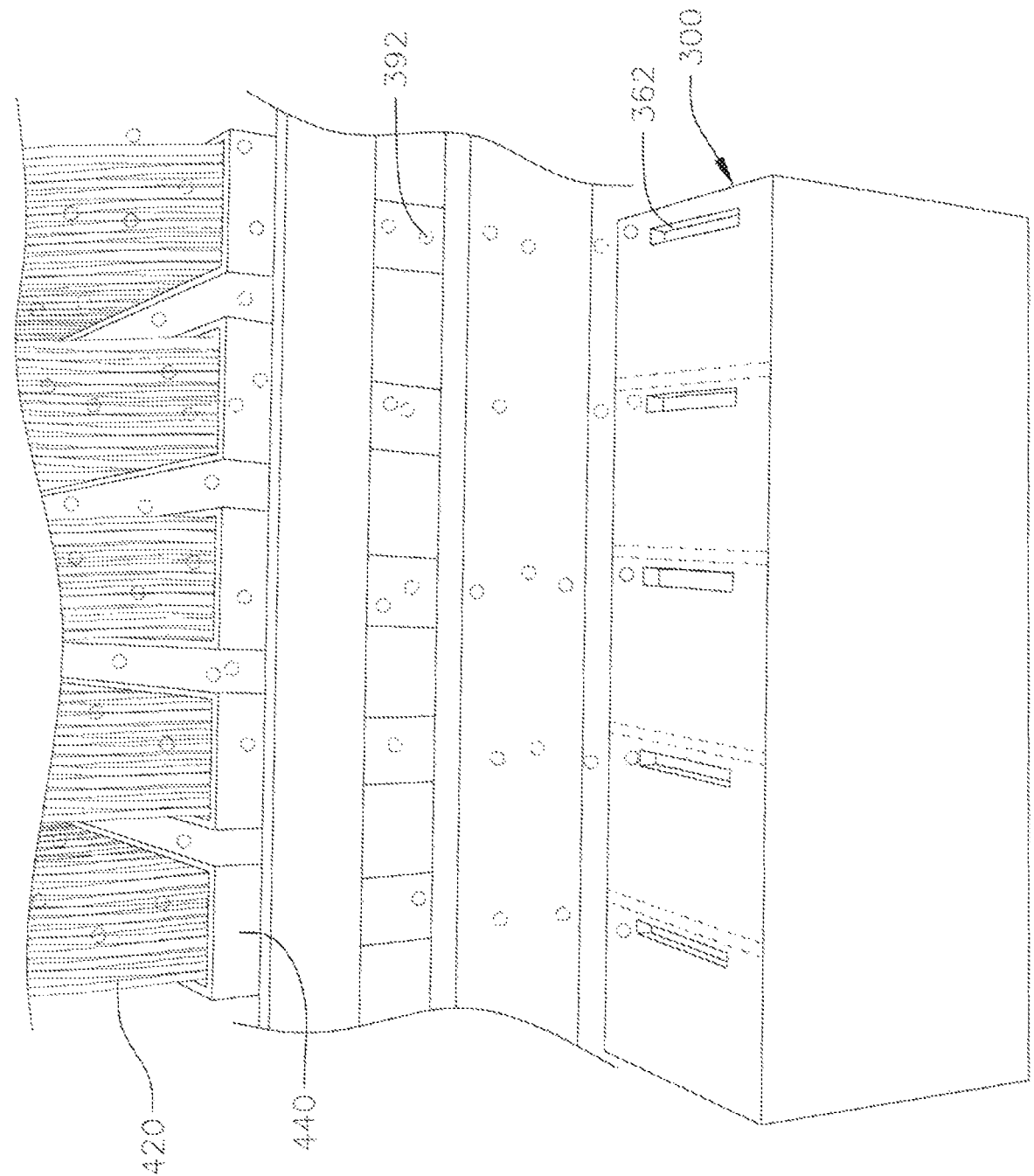
FIG. 11 is a perspective view of a lower portion of the filter system including an aerator device of FIG. 10.

With reference to FIGS. 10 and 11, a filter system 400 according to another embodiment of the present invention includes the aerator device 300 described above. However, the present invention is not limited thereto and, in other embodiments, the filter system 400 may include an aerator device according to another embodiment of the present invention.

According to an embodiment of the present invention, the filter system 400 includes the aerator device 300 and a filter 420. The aerator device 300, in one embodiment, is arranged below the filter 420 such that gas bubbles 392 released from the aerator device 300 may rise around and between elements of the filter 420 in order to clean surfaces of the filter 420. The aerator device 300, in one embodiment, is separate and spaced apart from the filter 420, such that the aerator device 300 may be positioned at a location relative to the filter 420 that provides efficient cleaning of the filter 420. In one embodiment, the aerator device 300 may be arranged in a gap between sub-modules or elements of the filter 420. The aerator device 300, as described above, includes the plurality of aerator device portions 310, the inlet opening 360 to flow a gas into the interior cavities of the aerator device portions 310, and a plurality of outlet openings 362 corresponding to the plurality of aerator device portions 310 to release the gas bubbles 392 upward toward the filter 420. The filter 420, in one embodiment, may be a membrane filter made up of one or more fiber bundles, such as hollow fibers, flat sheets, or other types of membranes. The aerator device 300 may be configured and arranged such that the outlet openings 362 provide efficient aeration of the filter 420. For example, in one embodiment, as illustrated in FIG. 11, each of the outlet openings 362 may be arranged generally corresponding to a respective fiber bundle or filter module of the filter 420 such that the gas bubbles 392 may rise between and contact the fiber bundles or filter modules of the filter 420. The filter 420, in another embodiment, may be a type other than a membrane, such as a sand filter. However, embodiments of the present invention are not limited thereto, and, in other embodiments, the filter 420 may include any other suitable filter device to be aerated by the aerator device 300. Further, the filter system 400 may be submerged in a liquid medium to be filtered.

In one embodiment, the filter system 400 further includes a frame 430, a lower header 440, and an upper header 450 supporting the filter 420. Further, the filter system 400 includes a gas supply 460 connected to the inlet opening 360 of the aerator device 300 to flow the gas into the interior cavity of the aerator device 300. Further, in one embodiment, the filter system 400 may include one or more liquid outlets 470 to remove filtered liquid from the filter 420. The liquid outlets 470 may be connected to a pump or other suitable device for flowing the filtered liquid from the filter 420.

With reference to FIGS. 12-15, an aerator device 500 according to another embodiment of the present invention is shown. The aerator device 500 according to one embodiment includes a plurality of aerator device portions, each having an interior cavity 530A, 530B, as illustrated in FIG. 15. In one embodiment, the aerator device 500 is a composite aerator device including an integral housing 520 defining the aerator device portions. Alternatively, the aerator device portions may be separate from one another and may each include an individual housing. While the aerator device 500 is illustrated as having two aerator device portions, the present invention is not limited thereto but, rather, may include any other desired number of aerator device portions.

The housing 520, in one embodiment, includes a pair of first opposing side walls 522, a pair of second opposing side walls 524 connecting the first opposing side walls 522, and a top wall 525 connecting the first and second opposing side walls 522, 524 to define an interior cavity of the housing 520. In one embodiment, the first opposing side walls 522 are generally parallel to each other, and the second opposing side walls 524 are generally parallel to each other and generally perpendicular to the first opposing side walls 522, such that the housing 520 has a generally box-like shape. The housing 520 further includes an intermediate wall 524' between and generally parallel to the second opposing side walls 524. The intermediate wall 524' divides the interior cavity of the housing 520 into interior cavities 530A, 530B of the respective aerator device portions. The housing 520 may be formed of a metal, a plastic, a fiberglass, a ceramic, or any other suitable material.

In one embodiment, each of the aerator device portions of the aerator device 500 includes a first plate 540A, 540B in the interior cavity 530A, 530B and extending from an upper end 542A, 542B to a lower end 544A, 544B, the first plate 540A, 540B being between the first opposing side walls 522 and defining a first cavity portion 532A, 532B and a second cavity portion 534A, 534B of the interior cavity 530A, 530B. The upper end 542A, 542B of the first plate 540A, 540B is spaced apart from the top wall 525 to define an opening therebetween through which the first cavity portion 532A, 532B and the second cavity portion 534A, 534B are in communication with each other. The aerator device portion further includes a second plate 550A, 550B in the interior cavity 530A, 530B that extends from an upper end 552A, 552B to a lower end 554A, 554B, The second plate 550A, 550B is between the first plate 540A, 540B and one of the first side walls 522 and defines a first chamber 536A, 536B and a second chamber 538A, 538B of the second cavity portion 534A, 534B. The upper end 552A, 552B of the second plate 550A, 550B is connected to the top wall 525, and the first chamber 536A, 536B and the second chamber 538A, 538B are in communication with each other below the lower end 554A, 554B of the second plate 550A, 550B. In one embodiment, the aerator device portion further includes a third plate 555A, 555B connecting the lower end 544A, 544B of the first plate 540A, 540B and one of the first side walls 522. The third plate 555A, 555B is spaced apart from the lower end 554A, 554B of the second plate 550A, 550B to define an opening below the lower end 554A, 554B of the second plate 550A, 550B through which the first chamber 536A, 536B and the second chamber 538A, 538B are in communication with each other. The first plates 540A, 540B, the second plates 550A, 550B, and the third plates 555A, 555B may be formed of a metal, a plastic, a fiberglass, a ceramic, or any other suitable material.

In embodiments of the present invention, the first plates 540A, 540B and the second plates 550A, 550B are substantially straight, such that the aerator device 500 is simple and easily manufactured. Also, in one embodiment, the first plates 540A, 540B and the second plates 550A, 550B extend from a respective one of the second opposing side walls 524 to the intermediate wall 524'. Further, the first plates 540A, 540B and the second plates 550A, 550B may extend generally parallel to the first opposing side walls 522.

The housing 520, in one embodiment, may have an inlet opening 560 through at least one side wall of the first or second opposing side walls 522, 524. In one embodiment, for example, the inlet opening 560 may be formed in one of the second opposing side walls 524. However, the present invention is not limited thereto, and, in other embodiments, the inlet opening may be at another location, such as in one of the first opposing side walls 522 or at a bottom portion of the housing 520, such that the inlet opening is in communication with the first cavity portion 532A, 532B. The inlet opening 560 is an inlet through which a gas, such as air, may be flowed into the first cavity portion 532A, 532B. In one embodiment, the intermediate wall 524' may have an inlet opening 560' through which the gas may pass between the interior chambers 530A, 530B of the adjacent aerator device portions. The housing 520 also has a plurality of outlet openings 562 formed through the top wall and in communication with the second chamber 538A, 538B of respective ones of the aerator device portions for releasing gas bubbles out of the aerator device portions from the second chamber 538A, 538B. The outlet openings 562, in one embodiment, may be slots extending generally parallel to the first opposing side walls 522. In one embodiment, the aerator device portions are spaced apart from one another in a first direction, and the outlet openings 562 of adjacent ones of the aerator device portions are offset relative to one another in a second direction perpendicular to the first direction and in an alternating manner, as illustrated in FIG. 12. The outlet openings 562 may be positioned relative to respective ones of a plurality of filter bundles or modules, for example.

FIGS. 16-18 are top schematic views of aerator devices according to further embodiments of the present invention. The aerator devices shown in FIGS. 16-18 are similar to the aerator device 300 and the aerator device 500 described above in that they are each made up of a plurality of aerator devices arranged adjacent one another and which may be connected in series and/or in parallel. For example, the aerator devices shown in FIGS. 16-18 may each include a plurality of aerator devices integrated into a main housing that is divided into a plurality of interior cavities of the respective aerator devices. Alternatively, one or more of the plurality of aerator devices may have an individual housing. Further, similar to the aerator device 300 and the aerator device 500 described above, the aerator devices shown in FIGS. 16-18 may each include a plurality of outlet openings to release intermittent gas bubbles, which may be arranged below and corresponding to respective ones of a plurality of filter bundles or modules.

With reference to FIG. 16, an aerator device 600 according to another embodiment of the present invention includes a plurality of aerator devices 610 integrated into a main housing 620 that is divided into a plurality of interior cavities of the respective aerator devices 610. The aerator device 600 has one or more inlet openings (not shown) to receive a gas (e.g., via a constant or substantially constant gas supply) into the interior cavities of the aerator devices 610, and a plurality of outlet openings 662 through a top wall of the housing 620 to release intermittent gas bubbles from the respective aerator devices 610. In one embodiment, the aerator devices 610 are spaced apart from one another in a first direction, and the outlet openings 662 of adjacent ones of the aerator devices 610 are offset relative to one another in a second direction perpendicular to the first direction and in an alternating manner, as illustrated in FIG. 16. The outlet openings 662 may be positioned relative to respective ones of a plurality of filter bundles or modules, for example.

With reference to FIG. 17, an aerator device 700 according to another embodiment of the present invention includes a plurality of aerator devices 710 integrated into a main housing 720 that is divided into a plurality of interior cavities of the respective aerator devices 710. The aerator device 700 has one or more inlet openings (not shown) to receive a gas (e.g., via a constant or substantially constant gas supply) into the interior cavities of the aerator devices 710, and a plurality of outlet openings 762 through a top wall of the housing 720 to release intermittent gas bubbles from the respective aerator devices 710. In one embodiment, the aerator devices 710 are spaced apart from one another in a first direction, and the outlet openings 762 of adjacent ones of the aerator devices 710 are substantially aligned with one another along the first direction, as illustrated in FIG. 17. The outlet openings 762 may be positioned relative to respective ones of a plurality of filter bundles or modules, for example.

With reference to FIG. 18, an aerator device 800 according to another embodiment of the present invention includes a plurality of aerator devices 810 integrated into a main housing 820 that is divided into a plurality of interior cavities of the respective aerator devices 810. The aerator device 800 has one or more inlet openings (not shown) to receive a gas (e.g., via a constant or substantially constant gas supply) into the interior cavities of the aerator devices 810, and a plurality of outlet openings 862 through a top wall of the housing 820 to release intermittent gas bubbles from the respective aerator devices 810. In one embodiment, some of the aerator devices 810 are spaced apart from one another in a first direction in a first row, and the outlet openings 862 of adjacent ones of the aerator devices 810 are offset relative to one another in a second direction perpendicular to the first direction, as illustrated in FIG. 18. Further, other ones of the aerator devices 810 are spaced apart from one another in the first direction in a second row adjacent the first row, and the outlet openings 862 of adjacent ones of the aerator devices 810 in the second row are offset relative to one another in the second direction and are each substantially aligned with the outlet opening of the respective adjacent aerator device 810 of the first row, as illustrated in FIG. 18. The outlet openings 862 may be positioned relative to respective ones of a plurality of filter bundles or modules, for example.

While embodiments of an aerator device according to the present invention are described above as having a rectangular or box-shaped housing, the present invention is not limited thereto. For example, with reference to FIGS. 19A and 19B, an aerator device 900 according to another embodiment of the present invention may include a cylindrical housing 902. In one embodiment, the housing 902 has an interior cavity, and includes a first plate 904 defining first and second cavity portions of the cavity, and a second plate 905 dividing the second cavity portion into first and second chambers, as described above with respect to other embodiments of the present invention. Also, similar to previously described embodiments, the aerator device 900 has an inlet opening 907 in communication with the first cavity portion, and an outlet opening 908 through an upper wall of the housing 902 for releasing gas bubbles from the second chamber. In other embodiments of the present invention, an aerator device may include a housing having any other suitable shape.

Figure 22:
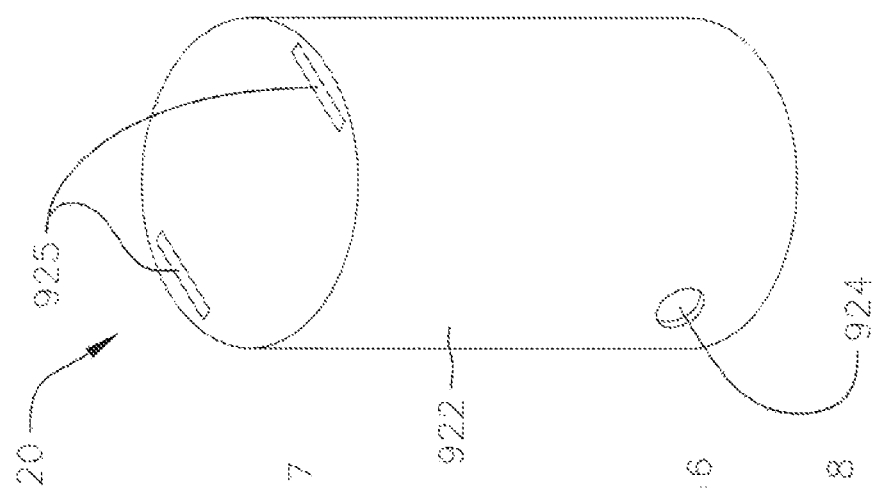
FIG. 22 is a perspective view of an aerator device according to another embodiment of the present invention.
Figure 21:
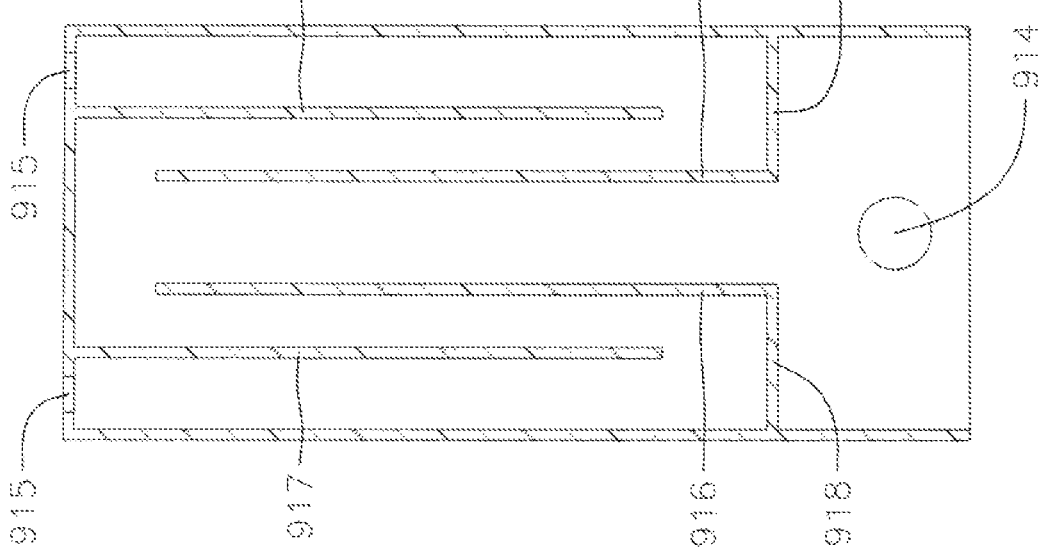
FIG. 21 is a cross-sectional view of the aerator device of FIG. 20.
Figure 20:
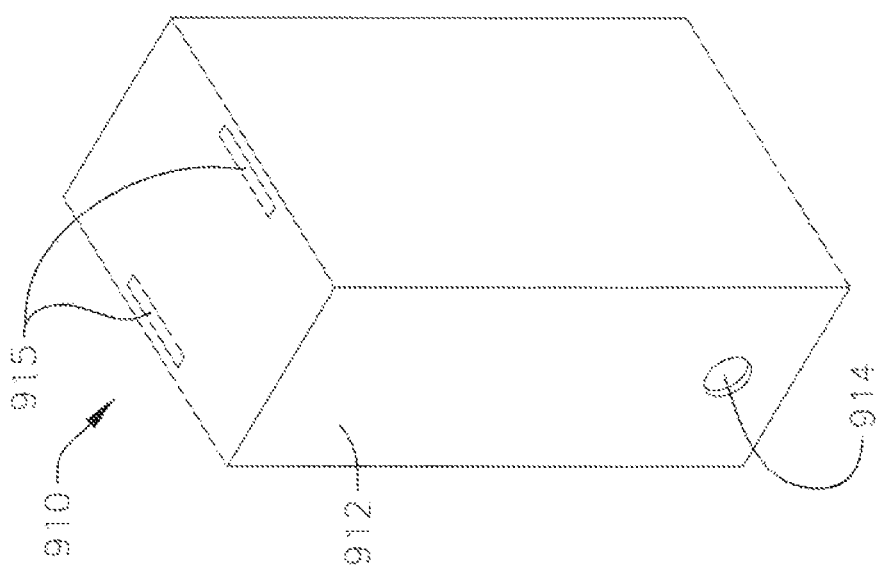
FIG. 20 is a perspective view of an aerator device according to another embodiment of the present invention.

With reference to FIGS. 20 through 22, an aerator device according to another embodiment of the present invention may have more than one outlet opening. For example, in one embodiment, as shown in FIGS. 20 and 21, an aerator device 910 may include a generally box-shaped housing 912 having an interior cavity and an inlet opening 914 and two outlet openings 915 in communication with the interior cavity. The housing 912, in one embodiment, includes two pairs of plates partitioning the interior cavity into chambers. That is, the housing 912 may include two first plates 916 defining first and second cavity portions of the cavity, and two second plates 917, each dividing a respective second cavity portion into first and second chambers, as described above with respect to other embodiments of the present invention. The housing 912 may also include third plates 918 between lower ends of the respective first plates 916 and outer walls of the housing 912. Also, similar to previously described embodiments, the aerator device 910 has the inlet opening 914 in communication with the first cavity portion, and the outlet openings 915 through an upper wall of the housing 912 for releasing gas bubbles from the respective second chambers. In another embodiment, as shown in FIG. 22, an aerator device 920 may include a cylindrical housing 922 having an interior cavity, and an inlet opening 924 and two outlet openings 925 in communication with the interior cavity. The aerator device 920 may have an interior configuration similar to that of the aerator device 910, as shown in FIG. 21, including two pairs of plates partitioning the interior cavity into chambers. Further, an aerator device according to another embodiment of the present invention may include a housing having any other suitable shape other than box-shaped or cylindrical.

With reference to FIG. 23, an aerator device 930 according to another embodiment of the present invention may include a housing 932 having an interior cavity and first and second plates 936, 937 dividing the interior cavity into chambers, as described above with respect to other embodiments of the present invention. However, in the aerator device 930, the first and second plates 936, 937 in the interior cavity may be curved rather than straight or flat. As such, the chambers defined by the first and second plates 936, 937 may have a curved cross-sectional shape, such as that of a semi-annular region or a half-circle, for example. Also, similar to previously described embodiments, the aerator device 930 has one or more inlet openings 934 in communication with the first cavity portion, and one or more outlet openings 935 through an upper wall of the housing 932 for releasing gas bubbles from the respective second chambers. The aerator device 930 may also include third plates 938 between lower ends of the respective first plates 936 and outer walls of the housing 932. Also, while the aerator device 930 is shown as having two housings 932 connected to each other and divided by an intermediate wall 939, the present invention is not limited thereto. That is, in other embodiments, the aerator device 930 may have a single aerator housing or more than two housings.

With reference to FIG. 24, an aerator device 10' according to another embodiment of the present invention includes a housing having an interior cavity and the first and second plates 40, 50 dividing the interior cavity into chambers, as described above with respect to the aerator device 10. In one embodiment, the aerator device 10' may have a same or substantially same configuration as the aerator device 10, including the first and second opposing side walls 22A, 22B, 24, the first and second plates 40, 50, and the inlet and outlet openings 60, 62, except that in the aerator device 10', a third plate 55' between the first plate 40 and an outer wall of the housing has an opening 56 formed therethrough. The opening 56 provides a passage for sludge to pass out of the second cavity portion. The aerator device 10' has high cleaning efficiency and may maintain long-term efficacy due to removal or prevention of sludge accumulation. Also, the aerator device 10' may have an increased pulse eruption frequency due to the opening 56. A size of the opening 56 may be selected according to a volume of the aerator device 10' and may also have various shapes. In one embodiment, the opening 56 may have a size between 3 mm and 10 mm. If the opening 56 is too small, removal of sludge may not be sufficiently achieved. If the opening 56 is too large, pulsed bubbles may not be generated. Also, the opening 56 through the third plate 55' is not limited to the configuration of the aerator 10' shown in FIG. 24, but may also be included in aerator devices of the present invention having other configurations, such as those described above with respect to FIGS. 19 to 23, for example.

With reference to FIGS. 25 to 28, some housing configurations and inlet opening locations of aerator devices according to various embodiments of the present invention are shown. As described above and shown in FIGS. 3A to 3E, for example, an inlet opening for injecting a gas into an interior cavity of a housing of an aerator device may be formed through at least one of a pair of first opposing side walls of the housing. However, the present invention is not limited thereto. In FIG. 25, for example, a housing of an aerator device 940 according to another embodiment of the present invention has an inlet opening 942 formed through one of a pair of second opposing side walls, and a conduit 944 is passed therethrough into an interior cavity of the housing to release or inject a gas into the interior cavity. With reference to FIG. 26, a housing of an aerator device 950 according to another embodiment of the present invention has an open bottom portion 952, and a conduit 954 passing below and apart from the housing releases or injects a gas Which rises into an interior cavity of the housing. In FIG. 27, a housing of an aerator device 960 according to another embodiment of the present invention is similar to that of FIGS. 3A to 3E and has an inlet opening 962 formed through one of a pair of first opposing side walls. However, in one embodiment, a bottom of the housing may be partially or substantially closed with a small opening 964. With reference to FIG. 28, a housing of an aerator device 970 according to another embodiment of the present invention has an opening 972 between two angled side portions 974 forming a bottom of the housing. A conduit 976 passing below and apart from the housing releases or injects a gas which rises into an interior cavity of the housing through the opening 972. As described above, in various embodiments of the present invention, a gas inlet conduit may be located below and spaced apart from a housing of an aerator device or may be directly connected to the housing. Also, a bottom portion of a housing of an aerator device may be fully open or partially open.

Figure 29:
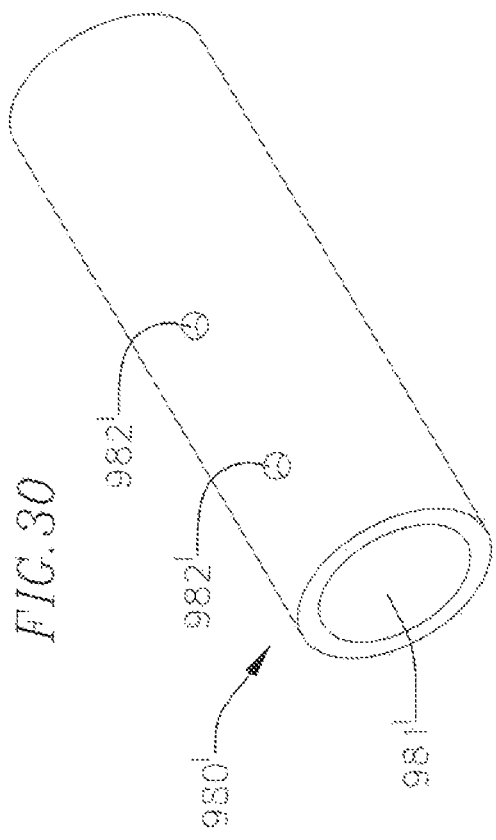
Figure 30:
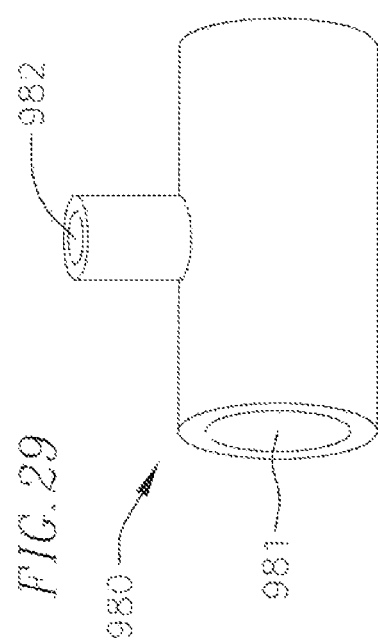
Figure 31B:
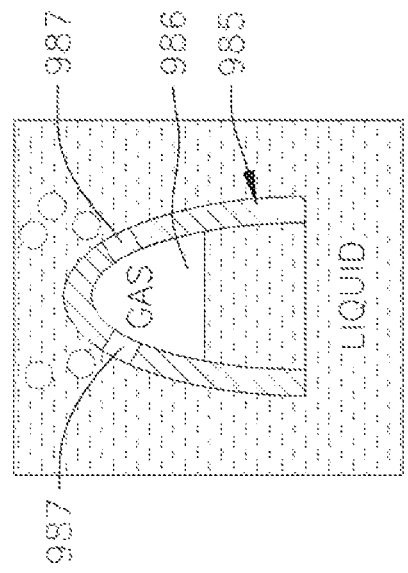
Figure 31A:
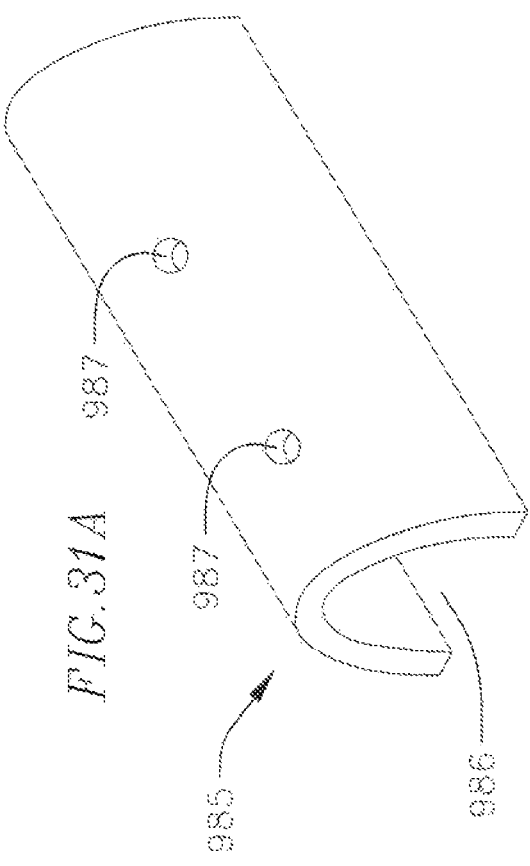

With reference to FIGS. 29 to 32B, some gas inlet portions, or gas distributors, of aerator devices according to various embodiments of the present invention are shown. The gas inlet portions, or gas distributors, shown and described below may be used to supply a gas into an aerator device, according to various embodiments of the present invention. The gas inlet portion, or gas distributor, may pass through the inlet opening of an outer wall, and may also pass through the inlet openings of one or more intermediate walls, such as shown in FIG. 8, for example, to supply the gas to one or more aerator devices. With reference to FIG. 29, in one embodiment, a gas inlet portion 980 for injecting a gas into an interior cavity of a housing of an aerator device, such as those described above with respect to FIGS. 3A to 3E and FIGS. 25 to 28, may be configured as a tube or pipe having a passage 981, and one or more extension portions (e.g., a T-shape), each having an opening 982, With reference to FIG. 30, in another embodiment, a gas inlet portion 980 for injecting a gas into an interior cavity of a housing of an aerator device may be similarly configured as a tube or pipe having a passage 981' and one or more openings 982' formed through an outer wall of the tube or pipe. However, the present invention is not limited thereto. In another embodiment, for example, as shown in FIGS. 31A and 31B, a gas may be passed through a gas inlet portion 985 having a reverse U-shaped conduit, such that the gas is entrapped at an upper portion 986 of the reverse U-shape (see FIG. 31B) to be injected through one or more openings 987 into an interior cavity of a housing of an aerator device according to an embodiment of the present invention.

With reference to FIGS. 32A and 32B, a gas inlet portion 980" for injecting a gas into an interior cavity of a housing of an aerator device, such as those described above with respect to FIGS. 3A to 3E and FIGS. 25 to 28, may be configured as a tube or pipe having a passage 981' and one or more openings 982' at an upper side of the tube or pipe. The gas inlet portion 980" further includes one or more openings 984" at a lower side of the tube or pipe and providing a passage for sludge to pass out of the gas inlet portion 980". The gas inlet portion 980" may be closed at a distal end of the passage 981'.

Figure 33:
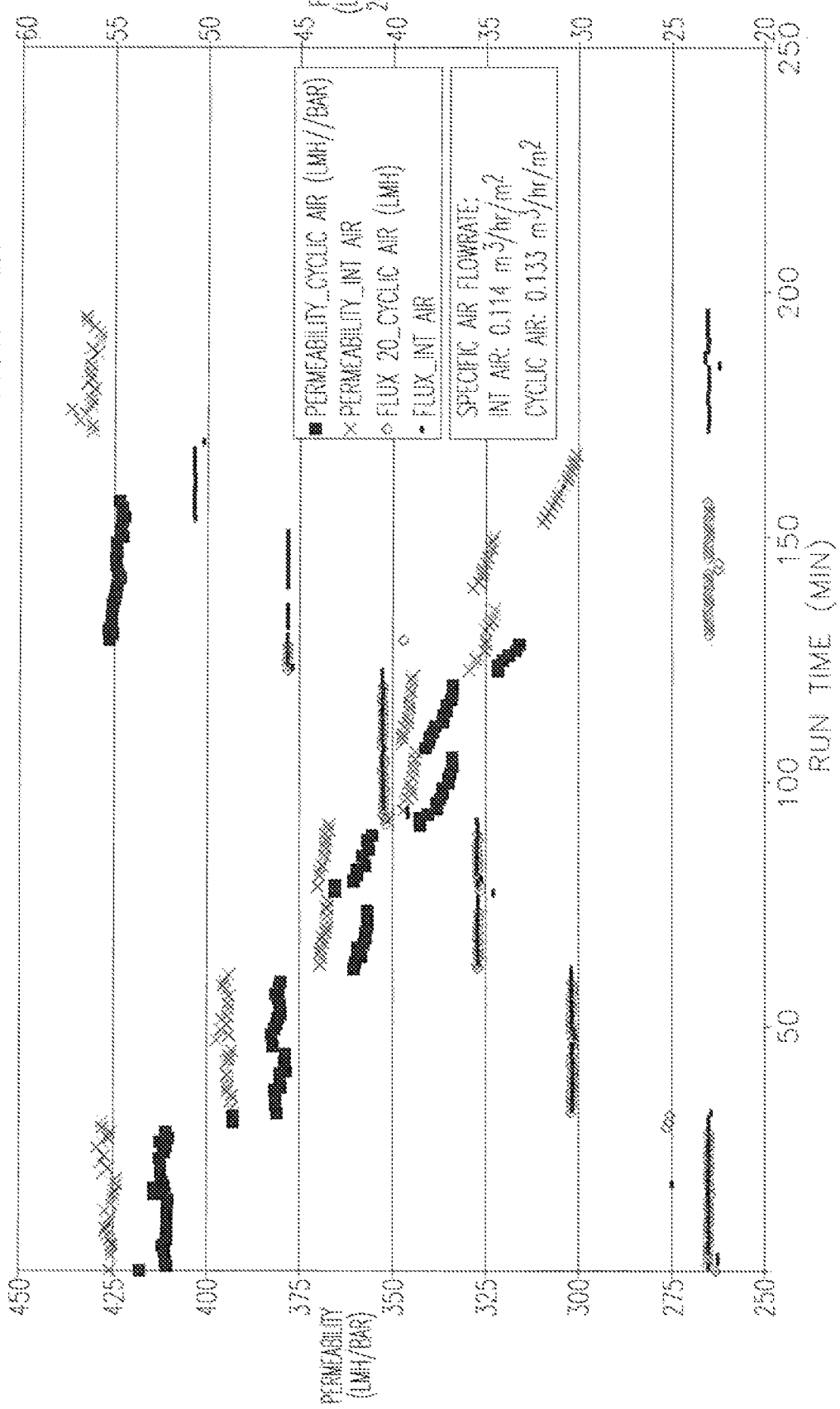
FIG. 33 is a chart showing results of testing an aerator device according to an embodiment of the present invention, and a conventional aerator device.

With reference to FIG. 33, results are shown of testing an aerator device according to an embodiment of the present invention, and a conventional aerator device, as described below.

In order to verify the efficiency of an aerator device according to an embodiment of the present invention and its efficacy versus conventional aerators, a pilot study was conducted. A membrane bioreactor (MBR) pilot was set up treating municipal wastewater. The mixed liquor concentration was ranged from 8,000 to 10,000 mg/L in the aerobic tank. Such mixed liquor was pumped into a membrane tank, where three membrane modules were installed. Each membrane module had a surface area of about 30 $m^2$ and the total membrane area tested was 90 $m^2$.

In the first set of operation, conventional aerators were installed underneath the membrane modules. The air was injected into modules in a cyclic mode of 10 seconds on and 10 seconds off. The cyclic aeration has been considered as one of effective ways to clean membranes at lower scouring air energy.

In the comparative tests, the conventional aerators were replaced with the aerator devices according to an embodiment of the present invention. Air was introduced into the air boxes continuously, and large intermittent air bubbles erupted out into the membrane modules to clean the membranes and to move away foulant accumulated on the membranes. As the MBR condition was maintained essentially the same for the both tests, the membrane fouling rate and the air usage were indicators of effectiveness of the two different aerations.

The operating protocol was firstly setting the operating flux and each filtration cycle kept at 15 minutes involving 14.5 minutes filtration and 0.5 minutes backwash plus air scouring. Two cycles were carried out for each flux rate. The flux rate was then changed to the next value. The operation stopped when a substantial permeability decrease or TMP rise was noticed during one cycle of filtration. FIG. 33 shows the results of the membrane permeability trend at different flux rates for the conventional cyclic aeration and intermittent aeration of the embodiment of the present invention. The specific air flow rate was set at 0.133 $m^3/hr/m^2$ membrane for the cyclic aeration and 0.114 $m^3/hr/m^2$ for the intermittent aeration of the embodiment of the present invention that was about 15% lower than the cyclic aeration. FIG. 33 shows that at flux rates lower than 30 $L/m^2/hr$ (LMH), both aeration modes kept membrane permeability stable, but the aerator device of the embodiment of the present invention required 15% less air. When the flux rates increased to higher than 30 lmh, the membrane permeability declined faster with cyclic aeration.

At the flux rate of 46 lmh, the operation with cyclic aeration had to be stopped due to very fast decline of membrane permeability, while the operation could continue with the aerator devices of the embodiment of the present invention. With the aerator devices of the embodiment of the present invention, the flux rate could even be further lifted to 51 lmh without interruption. No further flux increase was tested. The pilot test results clearly demonstrated that the aerator devices of the embodiment of the present invention ore efficient than cyclic aeration, and a lower air flow (and hence less energy) is required to achieve a better efficacy of cleaning membranes.

Although the drawings and accompanying description illustrate some exemplary embodiments of devices, systems, and methods, it will be apparent that the novel aspects of the present invention may also be carried out by utilizing other structures, sizes, shapes, and/or materials in embodiments of the present invention instead of or in addition to those described above and shown in the drawings.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An aerator device comprising:
   a housing comprising at least one side wall, and a top wall connected to the at least one side wall to define an interior cavity of the housing;
   a first plate in the interior cavity and extending from an upper end to a lower end, each of opposite sides of the first plate extending to a side wall of the at least one side wall, the first plate defining a first cavity portion and a second cavity portion of the interior cavity, the upper end being spaced apart from the top wall to define a first opening, the first cavity portion and the second cavity portion being in communication with each other through the first opening, a bottom of the first cavity portion adjacent to the lower end of the first plate being open to an outside of the first cavity portion;
   a second plate in the interior cavity and extending from an upper end to a lower end, the second plate being between the first plate and a first side wall of the at least one side wall and defining a first chamber and a second chamber of the second cavity portion, the upper end of the second plate being connected to the top wall, the first chamber and the second chamber being in communication with each other below the lower end of the second plate; and
   a third plate extending between the lower end of the first plate and the first side wall of the at least one side wall, the third plate being spaced apart from the lower end of the second plate to define a second opening extending from the lower end of the second plate to the third plate, the first chamber and the second chamber being in communication with each other through the second opening,
   wherein the housing has an inlet opening in communication with the first cavity portion, and an outlet opening in communication with the second chamber, wherein the inlet opening is an inlet through which a gas is flowable into the first cavity portion, and the housing is sealed at a top side of the interior cavity in the first cavity portion and the first chamber such that the gas passes from the first cavity portion through the first and second openings and the outlet opening releases gas bubbles out of the aerator device from the second chamber when the gas is flowed into the first cavity portion, wherein the inlet opening to receive the gas into the interior cavity of the aerator device is located at a bottom portion of the housing such that the gas rises to a top of the first cavity portion,
   the outlet opening is formed through the top wall, and
   wherein the first plate and the second plate are straight and the outlet opening is a slot extending parallel to the first plate and the second plate, or the first plate and the second plate are curved.

2. The aerator device of claim 1,
   wherein the at least one side wall comprises a pair of first opposing side walls, and a pair of second opposing side walls connecting the pair of first opposing side walls,
   wherein the first side wall of the at least one side wall comprises a first side wall of the pair of first opposing side walls, and
   wherein the first plate and the second plate extend from a first side wall of the pair of second opposing side walls to a second side wall of the pair of second opposing side walls.

3. The aerator device of claim 1, wherein the aerator device is configured to be submerged in a liquid medium and to intermittently release the gas bubbles from the outlet opening when the gas is supplied into the first cavity portion through the inlet opening at a constant rate.

4. The aerator device of claim 1, wherein the inlet opening passes through the at least one side wall at a first side of the housing, and the housing has another opening corresponding to the inlet opening and passing through the at least one side wall at a second side of the housing opposite the first side.

5. A filter system comprising:
   a filter;
   an aerator device arranged below the filter, the aerator device being spaced apart from the filter and movable relative to the filter, the aerator device comprising:
   a housing comprising at least one side wall, and a top wall connected to the at least one side wall to define an interior cavity of the housing;
   a first plate in the interior cavity and extending from an upper end to a lower end, each of opposite sides of the first plate extending to a side wall of the at least one side wall, the first plate defining a first cavity portion and a second cavity portion of the interior cavity, the upper end being spaced apart from the top wall to define a first opening, the first cavity portion and the second cavity portion being in communication with each other through the first opening, a bottom of the first cavity portion adjacent to the lower end of the first plate being open to an outside of the first cavity portion;
a second plate in the interior cavity and extending from an upper end to a lower end, the second plate being between the first plate and a first side wall of the at least one side wall and defining a first chamber and a second chamber of the second cavity portion, the upper end of the second plate being connected to the top wall, the first chamber and the second chamber being in communication with each other below the lower end of the second plate; and
a third plate extending between the lower end of the first plate and the first side wall of the at least one side wall, the third plate being spaced apart from the lower end of the second plate to define a second opening extending from the lower end of the second plate to the third plate, the first chamber and the second chamber being in communication with each other through the second opening,
wherein the housing has an inlet opening in communication with the first cavity portion, and an outlet opening in communication with the second chamber, wherein the inlet opening is an inlet through which a gas is flowable into the first cavity portion, and the outlet opening is arranged below the filter to release gas bubbles out of the aerator device from the second chamber toward the filter when the gas is flowed into the first cavity portion, and wherein the inlet opening to receive the gas into the interior cavity of the aerator device is located at a bottom portion of the housing such that the gas rises to a top of the first cavity portion,
the outlet opening is formed through the top wall, and
wherein the first plate and the second plate are straight and the outlet opening is a slot extending parallel to the first plate and the second plate, or the first plate and the second plate are curved; and
a gas supply connected to the inlet opening and configured to supply the gas to the first cavity portion such that the gas passes from the first cavity portion through the first and second openings to the second chamber,
wherein the filter system is submergible in a liquid medium.

6. The filter system of claim 5,
wherein the at least one side wall comprises a pair of first opposing side walls, and a pair of second opposing side walls connecting the pair of first opposing side walls,
wherein the first side wall of the at least one side wall comprises a first side wall of the pair of first opposing side walls, and
wherein the first plate and the second plate extend straight from a first side wall of the pair of second opposing side walls to a second side wall of the pair of second opposing side walls.

7. The filter system of claim 5,
wherein the filter comprises a fiber membrane filter, and wherein the filter system further comprises a pump to flow the liquid medium through the fiber membrane filter.

8. The filter system of claim 5, wherein the filter comprises a plurality of filter modules, and the aerator device comprises a plurality of aerator devices, a respective aerator device of the plurality of aerator devices being arranged below each filter module of the plurality of filter modules.

9. The filter system of claim 8,
wherein each of the respective aerator devices has a respective outlet opening, and
wherein the respective aerator devices are spaced apart from one another in a first direction, and the outlet openings of adjacent aerator devices of the respective aerator devices are offset relative to one another in a second direction perpendicular to the first direction and in an alternating manner.

10. A method of aerating a filter using an aerator device having an inlet opening and an outlet opening, the method comprising:
providing the aerator device including:
a housing comprising at least one side wall, and a top wall connected to the at least one side wall to define an interior cavity of the housing;
a first plate in the interior cavity and extending from an upper end to a lower end, each of opposite sides of the first plate extending to a side wall of the at least one side wall, the first plate defining a first cavity portion and a second cavity portion of the interior cavity, the upper end being spaced apart from the top wall to define a first opening, the first cavity portion and the second cavity portion being in communication with each other through the first opening, a bottom of the first cavity portion adjacent to the lower end of the first plate being open to an outside of the first cavity portion;
a second plate in the interior cavity and extending from an upper end to a lower end, the second plate being between the first plate and a first side wall of the at least one side wall and defining a first chamber and a second chamber of the second cavity portion, the upper end of the second plate being connected to the top wall, the first chamber and the second chamber being in communication with each other below the lower end of the second plate; and
a third plate extending between the lower end of the first plate and the first side wall of the at least one side wall, the third plate being spaced apart from the lower end of the second plate to define a second opening extending from the lower end of the second plate to the third plate, the first chamber and the second chamber being in communication with each other through the second opening,
wherein the housing has the inlet opening in communication with the first cavity portion, and the outlet opening in communication with the second chamber, wherein the inlet opening is an inlet through which a gas is flowed into the first cavity portion, and the outlet opening releases gas bubbles out of the aerator device from the second chamber, and wherein the inlet opening to receive the gas into the interior cavity of the aerator device is located at a bottom portion of the housing such that the gas rises to a top of the first cavity portion,
the outlet opening is formed through the top wall, and
wherein the first plate and the second plate are straight and the outlet opening is a slot extending parallel to the first plate and the second plate, or the first plate and the second plate are curved;
submerging the filter and the aerator device in a liquid medium;
arranging the aerator device below the filter, the aerator device being spaced apart from the filter and movable relative to the filter; and supplying the gas to the first cavity portion of the aerator device such that the gas passes from the first cavity portion through the first and second openings to the second chamber, wherein the outlet opening is arranged below the filter to release the gas bubbles out of the aerator device from the second chamber toward the filter when the gas is flowed into the first cavity portion.

11. The method of claim 10, wherein the at least one side wall comprises a pair of first opposing side walls, and a pair of second opposing side walls connecting the pair of first opposing side walls, wherein the first side wall of the at least one side wall comprises a first side wall of the pair of first opposing side walls, and wherein the first plate and the second plate extend substantially straight from a first side wall of the pair of second opposing side walls to a second side wall of the pair of second opposing side walls.

12. The method of claim 10, wherein the filter comprises a plurality of filter modules, and the aerator device comprises a plurality of aerator devices, and wherein arranging the aerator device below the filter comprises arranging a respective aerator device of the plurality of aerator devices below each filter module of the plurality of filter modules.

13. The method of claim 12, wherein each of the respective aerator devices has a respective outlet opening, and wherein arranging the respective aerator devices comprises spacing the respective aerator devices apart from one another in a first direction, and offsetting the outlet openings of adjacent aerator devices of the respective aerator devices relative to one another in a second direction perpendicular to the first direction and in an alternating manner.

14. The method of claim 10, wherein supplying the gas to the aerator device comprises supplying the gas at a constant rate.

15. The method of claim 10, further comprising flowing the liquid medium through the filter.

* * * * *